United States Patent
Thaler

(10) Patent No.: US 12,073,313 B2
(45) Date of Patent: *Aug. 27, 2024

(54) ELECTRO-OPTICAL DEVICES AND METHODS FOR IDENTIFYING AND INDUCING TOPOLOGICAL STATES FORMED AMONG INTERCONNECTING NEURAL MODULES

(71) Applicant: Stephen L. Thaler, St. Charles, MO (US)

(72) Inventor: Stephen L. Thaler, St. Charles, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/339,658

(22) Filed: Jun. 22, 2023

(65) Prior Publication Data

US 2023/0351166 A1    Nov. 2, 2023

Related U.S. Application Data

(63) Continuation of application No. 16/449,013, filed on Jun. 21, 2019, now Pat. No. 11,727,251, which is a
(Continued)

(51) Int. Cl.
G06N 3/063    (2023.01)
G06N 3/045    (2023.01)
G06N 3/08    (2023.01)

(52) U.S. Cl.
CPC ............ *G06N 3/063* (2013.01); *G06N 3/045* (2023.01); *G06N 3/08* (2013.01)

(58) Field of Classification Search
CPC ......... G06N 3/063; G06N 3/0454; G06N 3/08
See application file for complete search history.

(56) References Cited

U.S. PATENT DOCUMENTS 5,446,829 A    8/1995    Wang et al.
5,659,666 A    8/1997    Thaler
(Continued)

FOREIGN PATENT DOCUMENTS

GB    2336227 A    10/1999
WO    2013090451 A1    6/2013

OTHER PUBLICATIONS

Wei, Xianmin. "Research of neural networks in image anomaly identification application." Advanced Technology in Teaching—Proceedings of the 2009 3rd International Conference on Teaching and Computational Science (WTCS 2009). Springer, Berlin, Heidelberg, 2012.
(Continued)

*Primary Examiner* — Kakali Chaki
*Assistant Examiner* — Ababacar Seck
(74) *Attorney, Agent, or Firm* — Husch Blackwell LLP

(57) ABSTRACT

A system for monitoring an environment may include an input device for monitoring and capturing pattern-based states of a model of the environment. The system may also include a thalamobot embodied in at least a first processor in communication with the input device. The thalamobot may include at least one filter for monitoring captured data from the input device and for identifying at least one state change within the captured data. The system may also include at least one critic and/or at least one recognition system. The at least one filter forwards said at least one state change to the critic and/or recognition system. Novel schemes are introduced to allow processors to interconnect themselves into brain-like structures that contemplate both the environment and the model thereof, unifying disparate data into discoveries. The significance of such discoveries is recognized either through neural activation patterns or the topologies of interconnecting neural modules.

48 Claims, 9 Drawing Sheets

Related U.S. Application Data continuation of application No. 14/766,170, filed as application No. PCT/US2015/010051 on Jan. 2, 2015, now Pat. No. 10,423,875.

(60) Provisional application No. 61/924,624, filed on Jan. 7, 2014.

(56) References Cited

U.S. PATENT DOCUMENTS

| | | | |
|---|---|---|---|
| 6,356,884 B1* | 3/2002 | Thaler | G06N 20/00 706/30 |
| 6,401,082 B1 | 6/2002 | Kropas-Hughes et al. | |
| 6,804,600 B1 | 10/2004 | Uluyol et al. | |
| 7,309,315 B2 | 12/2007 | Kullok et al. | |
| 7,454,388 B2* | 11/2008 | Thaler | G06F 18/214 706/45 |
| 7,545,388 B2 | 6/2009 | Wright | |
| 8,250,011 B2* | 8/2012 | van der Made | G06N 3/088 706/45 |
| 8,463,722 B2* | 6/2013 | Knoblauch | G06N 3/08 706/45 |
| 8,521,669 B2* | 8/2013 | Knoblauch | G06N 3/04 706/16 |
| 9,101,279 B2 | 8/2015 | Ritchey et al. | |
| 2003/0065409 A1 | 4/2003 | Raeth et al. | |
| 2007/0011119 A1* | 1/2007 | Thaler | G06N 3/045 706/16 |
| 2007/0156054 A1 | 7/2007 | Korzinov et al. | |
| 2011/0161268 A1* | 6/2011 | Nugent | G06N 3/08 706/26 |
| 2015/0100530 A1* | 4/2015 | Mnih | A63F 13/67 706/25 |
| 2015/0339570 A1 | 11/2015 | Scheffler | |

OTHER PUBLICATIONS

Jiang, Yulei, et al. "A study of the effect of noise injection on the training of artificial neural networks." Neural Networks, 2009. IJCNN 2009. International Joint Conference on. IEEE, 2009.

Thaler, Stehen L. PhD, Thalamocortical Algorithms in Space! The Building of Conscious Machines and the Lessons Thereof—2010.

Pazienti, Francesco, Neural Networks Simulation With Array Processors—1991.

Bailing Zhang, Minyue FR, Hong Yan and Marwan A. Jabri, Handwritten Digit Recognition by Adaptive-Subspace Self-Organizing Map (ASSOM)—1991.

* cited by examiner

ELECTRO-OPTICAL DEVICES AND METHODS FOR IDENTIFYING AND INDUCING TOPOLOGICAL STATES FORMED AMONG INTERCONNECTING NEURAL MODULES

CROSS-REFERENCE TO RELATED APPLICATIONS

This application is a continuation application of U.S. patent application Ser. No. 16/449,013, filed on Jun. 21, 2019, which is a continuation application of U.S. patent application Ser. No. 14/766,170, filed on Aug. 6, 2015, which is a U.S. National Phase Application of International Application PCT Application No. PCT/US15/10051, filed on Jan. 2, 2015, which claims the benefit of priority from U.S. Provisional Patent Application Ser. No. 61/924,624, filed on Jan. 7, 2014. The disclosures of U.S. patent application Ser. No. 16/449,013, U.S. patent application Ser. No. 14/766,170, International Application PCT Application No. PCT/US15/10051, and U.S. Provisional Patent Application Ser. No. 61/924,624 are incorporated herein by reference in their entireties.

TECHNICAL FIELD OF THE INVENTION

The invention relates generally to the fields of both artificial intelligence and machine consciousness and, more particularly, to a method and device for the unification and origination of knowledge within connectionist systems.

BACKGROUND OF THE INVENTION

The thalamus has been described as the "eyeball" or "projection screen" of the brain, monitoring the continuously evolving cortical activity that may be thought of as the brain's "multimedia show," while also serving as a trigger for global or "volume" release of neurotransmitters into the cortex. When attempts are made to build artificial neural systems approaching the size and complexity of the human cortex, memory and processors are so heavily taxed that any monitoring algorithm needs to run either intermittently as a separate thread or process on the same computational platform. Furthermore, as these synthetic cortical systems become more extensive and complex it becomes increasingly difficult to isolate the formation of associative chains that reveal important relationships or the emergence of novel patterns tantamount to ideas and improvisational strategies. Should the monitoring thalamic portion be run on a separate platform, communication is limited by serial protocols (e.g., TCP/IP over Ethernet) that must transmit billions of bytes of information to broadcast just one of myriad states of the cortical algorithm. In the first case of intermittent execution of the monitoring algorithm, valuable activation patterns may be missed within the cortical algorithm. In the second case of threads executing the thalamic algorithm in parallel with the cortical, the states of the synthetic cortex must be passed via immense data structures, resulting in significant delays in the evaluation of cortical activation patterns. The same may be said of transmission protocols between separate machines.

In U.S. Pat. No. 5,659,666, simulated volume release of neurotransmitters was controlled through at least one critic or neural net that was capable of graduating mean synaptic perturbation level to create more "twisted" pattern-based notions until it was 'satisfied' with one or more of them. Later, in U.S. Pat. No. 7,454,388, those false memories deemed valuable or useful by this critic were reinforced in a process that simulates serotonin and dopamine release preparatory to the brain's memorization of useful confabulations. That system thus bootstraps itself through cycles of idea generation followed by memorization of such notions, along the way hybridizing ideas into more useful or interesting concepts. However, such systems were restricted in part by typical processing bottlenecks.

SUMMARY OF THE DISCLOSURE

In a system in which a synthetic cortex is composed of a multitude of neural modules, and in which the generation of potentially useful confabulation states therein are governed through the global release of simulated neurotransmitters, a mechanism is provided for herein which locates unusual or useful neural activation patterns and chains arising within the entire neural assembly that could qualify as potential ideas or action plans. A confabulation may be thought of as a false memory activating within either a biological or synthetic neural net, which may or may not prove useful or informative to a critic agency, the latter being either protoplasmic or artificial. Typically, neurotransmitter release is thought of as localized, as in the transmission of packets of molecules across the synaptic cleft between neurons, tantamount to the current in an artificial neural network between two computational processing units. Volume or global neurotransmitter release is not specific to any synapse and is the result of biological neurons specialized in suffusing many synapses simultaneously within the brain's neural networks with neurotransmitters. Herein, such global neurotransmitter release is simulated though various forms of perturbations and disturbances to connection weights and/or computational neurons.

Methodologies are discussed herein for implementing both spatial and temporal anomaly detection to locate and identify freshly forming candidate notions from extensive ensembles of neural nets, prior to their passage to critic systems for evaluation. With the ability to promote the formation of the chains of neural modules, disparate information is being combined so as to unify memories, both true and false, into more complex concepts and strategies.

This patent teaches various methods for the unification and origination of knowledge as well as both exteroceptive and interoceptive awareness within artificial neural systems consisting of a plurality of artificial neural modules. The unification process occurs at several levels:

1. Continuous connection/disconnection of neural modules to produce ideational chains and networks among neural modules.
2. Bridging of those chains and networks under the scrutiny of the computational equivalent of a reptilian brain and limbic system (e.g., thalamus, amygdala, and hippocampus) that triggers the formation of more original chains or the reinforcement of those deemed useful. Such chains are the basis of ideas.
3. Classification of the state of the entire collective of neural modules, treating their joint activations and network chains as if they were objects (e.g., 2- or 3-dimensional geometric forms) in the natural environment, detected via machine vision or acoustic processing algorithms, thereby departing from the traditional paradigm of critic functions that produce numerical figures of merit for ideational neural activation patterns, in that locations, topologies, and shapes of chaining patterns serve as a qualitative evaluation of any forming concept or action plan.

4. More effective monitoring/unification via the equivalent of multiple reptilian brains monitoring and controlling such ideational chaining (i.e., a multitrack synthetic mind).
5. The reciprocal bridging of reptilian component back to the collective of neural modules via axonal feedback connections as well as simulated chemical connectionism (e.g., synaptic and neuronal noise through stress neurotransmitters as well as potentiating neurotransmitters to trigger learning/strengthening of newly formed associative chains deemed meritorious by the system).
6. The integration of multiple cortical simulations into one through at least one final network layer.
7. The invention of significance to the totality, or any part thereof, of neural activations and chaining topologies within such a system through the formation of reactive neural activations and chaining topologies that constitute a subjective or emotional response thereto, regardless of their veracity (i.e., consciousness) and the use of such subjective response to strengthen or weaken the system's self-reflective notions as they form.

In embodiments of the described device and method, the cortical and thalamic functions may be divided between at least two separate computational platforms or subsystems. In one subsystem, cortical function is generated, driven by both external events and/or internal noise so as to produce a succession of activation chains tantamount to ideas. The thalamic system, the second subsystem, may be implemented on a separate processor, platform, or thread using a sensor to monitor a display (e.g., visual, auditory) of neuronal activations within the cortical simulation. The thalamic algorithm may asynchronously scan this cortical display to glean the succession of cortical states, typically at much higher rates than could be attained via multithreading or serial communications. The incorporation of filters, in the form of adaptive anomaly and/or rhythm detectors isolate newly emerging concepts in the form of chaining or networking neural modules. Subsequent stages within the cortical or thalamic system consist of one or more neural modules that map the patterns or topologies collectively represented within such chains to metrics of utility, value, or novelty. These subsequent stages may themselves take the form of chains of neural modules, the location, shape, and/or topology of which represents some figure of novelty, utility, or value. Topology refers to the connectivity between neural modules determined either through connection weight pathways or the learned order of pattern broadcasts among them.

The same thalamic system may have the ability to modulate global noise levels within the cortical subsystem via serial or parallel communications or reciprocal sensor schemes, allowing it to raise perturbation levels should satisfactory solution patterns not be initially found. Having found a valuable associative chain or network, tantamount to a concept or action plan, the thalamic system has the ability to cease perturbations and harvest the notion or trigger other algorithms to implement the idea or strategy. The same thalamic algorithm also has the ability to trigger adaptive learning in the case that a potentially useful ideational chaining topology forms, thus strengthening the connectivity of that topology as a latent memory that may later be called upon under similar environmental circumstances, be activated through stochastic/perturbative processes, or to be used as a component of more complex notions, through the fusion of it with other such memories.

Such a system may serve as a laboratory to observe the emergence of consciousness from component neurons and neural modules, using various affordances to monitor for the evolution of self-reflection and interpretation (i.e., the invention of significance to itself). Used in this way, the displays of cortical activations, along with thalamobot detection/feedback, will become an important research tool for identifying the neural correlates of cognition, creativity, and consciousness.

The current system relates to an enhanced manner of operation of Creativity Machines, imagitron-perceptron coalitions between which inventive dialogs occur, such as are described in U.S. Pat. Nos. 5,659,666 and 7,454,388, each of which is incorporated by reference herein in its entirety. Inherent to such neural architectures is a bottleneck between the imagitron and perceptron components that becomes more pronounced as the generative network, tantamount to the brain's cortex, is increased in size or if it becomes compound in nature, encompassing myriad subnetworks.

The system may involve the use of an output device, such as a computer monitor (e.g. CRT flat panel LED, LCD, etc.) or other visual media (e.g., LCD, LED, projectors) or other sensory output devices, to present the neural activation patterns of an imagitron or other connectionist architecture that can in turn be sensed or scanned by an input device in communication with filtering and evaluation systems (e.g., perceptrons). In one embodiment, the output is via a visual output that can in turn be scanned for valuable or novel activation patterns via a camera or other such sensors. In another embodiment, a linear or raster scan is utilized to observe the succession of patterns. In a preferred embodiment, a foveational scheme, such as that described in U.S. Pat. No. 7,545,388, wherein a camera is operated with a wandering attention window or where a camera is able to pan, tilt, and zoom so as to locate interesting and newly emergent patterns having utility or value, is utilized to monitor a visual output. This same foveational scheme may take the form of a fixed camera whose video stream may be searched by a wandering attention window. In other embodiments, change detection techniques via group membership filters, see U.S. Pat. No. 7,545,388, are used to filter for the evaluation of newly emerging patterns from the imagitrons.

In the brain this "foveational" process corresponds to the population polling of a collection of neurons whose activation center of gravity dictates where the eyeball looks. Alternately, this cognitive process corresponds to the movement of an internal attention window over visual cortex to focus on certain pieces of the brain's working image of the external environment. Herein this process is achieved using internally perturbed neural nets to chaotically move an attention window around an environment until it clips or captures an item or activity of interest to a critic algorithm or neural net that then reduces the noise within the former net so that the attention window becomes trapped on the item of interest. Also, herein, the environment is not the external environment, but a model of an environment that may be attained via a system of chaining neural modules.

The system operates similarly to the interaction between the cortex and thalamus in the human brain, with the monitoring sensor and thalamobot, tantamount to the reptilian brain, shifting its attention to newly emerging neural activation patterns appearing within the visual display. If multiple visual outputs are used, the system can serve in the detection of important spatial-temporal connections/correlations between emergent patterns in the various displays thus unifying them into more complex associations, achieving complex graph analysis without a super-computer.

In addition, a methodology is taught for isolating such notions and relationships utilizing recent research findings that indicate a relationship between the novelty and rhythm of idea generation within connectionist architectures as described in the paper "Synaptic Perturbation and Consciousness", Thaler, S. L., published in International Journal of Machine Consciousness, December 2014, which is incorporated by reference herein in its entirety. Considering the stream of complex activation patterns forming within such computational systems as ideas nucleating within cortex, various external agencies are recruited to emulate the function of the reptilian brain, on the lookout for activation patterns among cortical modules that are anomalous spatially or temporally. Aside from purely algorithmic routines that scan such neural ensembles for valuable notions, a technique is taught herein for using sensor based technology such as cameras to scan two or three dimensional displays of global neural activation so to either (1) focus in on novel pattern formation within the connectionist array, or (2) eliminate all but the factual associations forming as in an advanced data mining applications, or (3) integrate the activations of multiple neural modules so as to achieve highly complex mappings. The systems described herein may be implemented with neural network simulations or hardware-implemented neural networks such as GPUs, FPGAs, specialty ASIC chips, as well as non-silicon-based computational systems.

In one example embodiment, a system for monitoring an environment comprises: an input device for monitoring and capturing pattern-based states of a model of the environment; a thalamobot embodied in at least a first processor, in which the first processor is in communication with the input device. The thalamobot includes at least one filter for monitoring captured data from the input device and for identifying at least one state change (e.g., newly arising data) within the captured data. The system also includes at least one critic. The at least one filter forwards the at least one state change to the critic, and the critic judges the merit of the at least one state change.

The filter may include an anomaly filter and/or a rhythm detector. The input device may be a camera which transmits pattern-based states as captured images to the thalamobot. The input device may be a microphone which transmits pattern-based states as captured sound to the thalamobot. The critic may include a plurality of neural modules, which may chain together in patterns which serve as a figure of merit for the at least one state change. The thalamobot may be embodied on the at least one processor in a computer system which is separate from a computer system on which the model of the environment is generated. The pattern-based states of the model of the environment may be generated by an output device which outputs the pattern-based states in the form of reconstruction errors of a plurality of neural modules in an imagitron, or in the form of a topology of chains forming in an imagitron, or in the form of activation histories of a plurality of neural modules in an imagitron, or in the form of topological chain formation histories of a plurality of neural modules in an imagitron. The model of the environment may be a brain scan. The thalamobot may be in communication with the computer system on which the model of the environment is generated to modify a level of noise injected into the model, in which raising the level of noise to the model generates new ideas within the model. Alternatively or in addition, the thalamobot may be in communication with the computer system on which the model of the environment is generated to promote learning within the model. The neural modules may be embodied on an array of processors, or on a single processor.

In another example embodiment, a system comprises: an imagitron embodied on at least a first processor, in which the imagitron includes a first plurality of neural modules and is capable of accepting environmental inputs; an output device in communication with the imagitron for outputting a state of one or more of the first plurality of neural modules; an input device for monitoring the state of one or more of the first plurality of neural modules output via the output device; a thalamobot embodied on at least a second processor separate from the at least one first processor, in which the second processor is in electronic communication with the input device and includes at least one filter for monitoring captured data from said input device and for identifying at least one state change data within the captured data; and at least one critic. The at least one filter forwards the at least one state change to said at least one critic, which judges merit of the at least one state change.

The output device may be a display screen which displays the data in the form of respective reconstruction errors of at least some of the first plurality of neural modules, or in the form of activations of at least some of the first plurality of neural modules. The output device may also be a speaker. The filter may be an anomaly filter or a rhythm filter. The input device may be a camera which captures and transmits data output from the output device in the form of respective reconstruction errors of at least some of the first plurality of neural modules, or in the form of activations of at least some of the first plurality of neural modules. The input device may be a microphone which transmits output data as captured audio to the thalamobot. The critic may include a second plurality of neural modules, and the filter may include a third plurality of neural modules. Respective clusters of one or more neural modules of the third plurality of neural modules may be assigned to monitor pre-assigned portions of the output data. The thalamobot may be embodied on a processor in a computer system which is separate from the environment from which output data is captured by the input device.

The thalamobot may be in electronic communication with the imagitron for controlling a noise level within the first plurality of neural nodes. The thalamobot may cause an increase in the noise level within the first plurality of neural nodes in response to a lack of meritorious chaining data as determined by the at least one critic. The thalamobot may be in electronic communication with the imagitron for controlling chain cancellation and chain reinforcement within the imagitron. The input device may foveationally monitor the data output from the output device. The thalamobot may include a plurality of thalamobots, each analyzing respective portions of the output data captured by said input device. The input device may include a plurality of input devices. The thalamobot may include a plurality of thalamobots, each analyzing respective portions of the output data captured by one or more of the plurality of input devices. The thalamobot may be in communication with the imagitron to raise the level of noise in the imagitron to generate new chaining within the imagitron, or to raise the level of noise in the imagitron to generate variations in interpretation of the environmental inputs to the imagitron. The thalamobot may be in communication with said imagitron to promote reinforcement of desirable chains within the imagitron, or to discourage undesirable chains within the imagitron.

A plurality of any of said neural modules may be embodied on an array of processors. The critic may be embodied within said thalamobot by one or more neural modules of a second set of neural modules, or may be embodied within the first set of neural modules of the imagitron. The thalamobot may further be in communication with the imagitron to instruct one or more of the neural modules in the first plurality of neural modules to operate hetero-associatively or auto-associatively. The input device may be a camera which captures and transmits data output from the output device in the form of topology of chains forming in the imagitron. The thalamobot may further include at least one buffer to capture ordinality of chain formations.

The first plurality of neural modules of the imagitron may emulate a stream of consciousness, and the thalamobot may promote or impede associative chains within the imagitron representing a subjective feel of the stream of consciousness. The "subjective feel of consciousness," often referred to as "qualia," are the ineffable and private sensations that are difficult to communicate to an outside observer or to duplicate in machine intelligence. Herein, this phenomenon is simulated through the formation of associative chains of artificial neural nets coined "associative gestalts," the term inspired by the fact that memories within such chains likely activate serially in a succession of stored sensory experiences, but the overall impression encoded in such chains is more than the sum of these individual experiences. The whole chain's total significance cannot be surmised in any instant. With chains consisting of stressful memories, collateral effects such as sweating and vasodilation take place, while the more positive memory chains may trigger neurotransmitters encoding pleasure or euphoria (Thaler, 2014). In support of arguments that such feelings cannot be numerically reproduced, the current invention partially relies upon non-numerical measures of merit to any initial thought or perception, namely the location, shape, and topology of such reactive chains within an assembly/collection of artificial neural modules.

In another example embodiment, a system for monitoring an environment comprising: an imagitron embodied on at least a first processor, in which the imagitron including a first plurality of neural modules that is capable of accepting environmental inputs; an output device in communication with the imagitron for outputting a state of one or more of the first plurality of neural modules; an input device for monitoring the state of one or more of the first plurality of neural modules output via the output device; a thalamobot embodied on at least a second processor separate from the at least one first processor, in which the second processor is in electronic communication with the input device. The thalamobot also includes at least one recognition system which recognizes sub-pattern states, in which the sub-pattern states have formed in reaction to ideational sub-patterns within the first plurality of neural modules. The recognition system is then capable of determining merit or lack thereof by virtue of at least one of the location, shape, and topology of said sub-patterns.

The recognition system may control injection of noise into the imagitron and reinforcement learning within the imagitron. The thalamobot may direct chaining of neural modules within the imagitron through an associative memory. Injection of noise into the imagitron may cause the formation of latent ideas via wearing-in of pathways between modules when the thalamobot is inattentive. At least some of the first plurality of modules may each be embodied on a separate processor, in which such a processor includes registers, RAM, and a cache. A GMF may be incorporated into at least one of the registers, RAM, and cache. Each GMF may govern how its respective processor cooperates with other such GMF-equipped processors in generating associative chains within the imagitron. The thalamobot may include at least one filter for monitoring captured data from the input device and for identifying at least one state change within the captured data. The filter may pass the at least one state change to the recognition system or thalamobot.

In another example embodiment, a system for monitoring an environment comprising: an imagitron embodied on at least a first processor, in which the imagitron including a first plurality of neural modules that is capable of accepting environmental inputs; an output device in communication with the imagitron for outputting a state of one or more of the first plurality of neural modules; an input device for monitoring the state of one or more of the first plurality of neural modules output via the output device; a thalamobot embodied on at least a second processor separate from the at least one first processor, in which the second processor is in electronic communication with the input device. The thalamobot also includes at least one mapping system which detects states within the first plurality of neural modules, and maps the states to at least one predetermined output pattern.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

Figure 1:
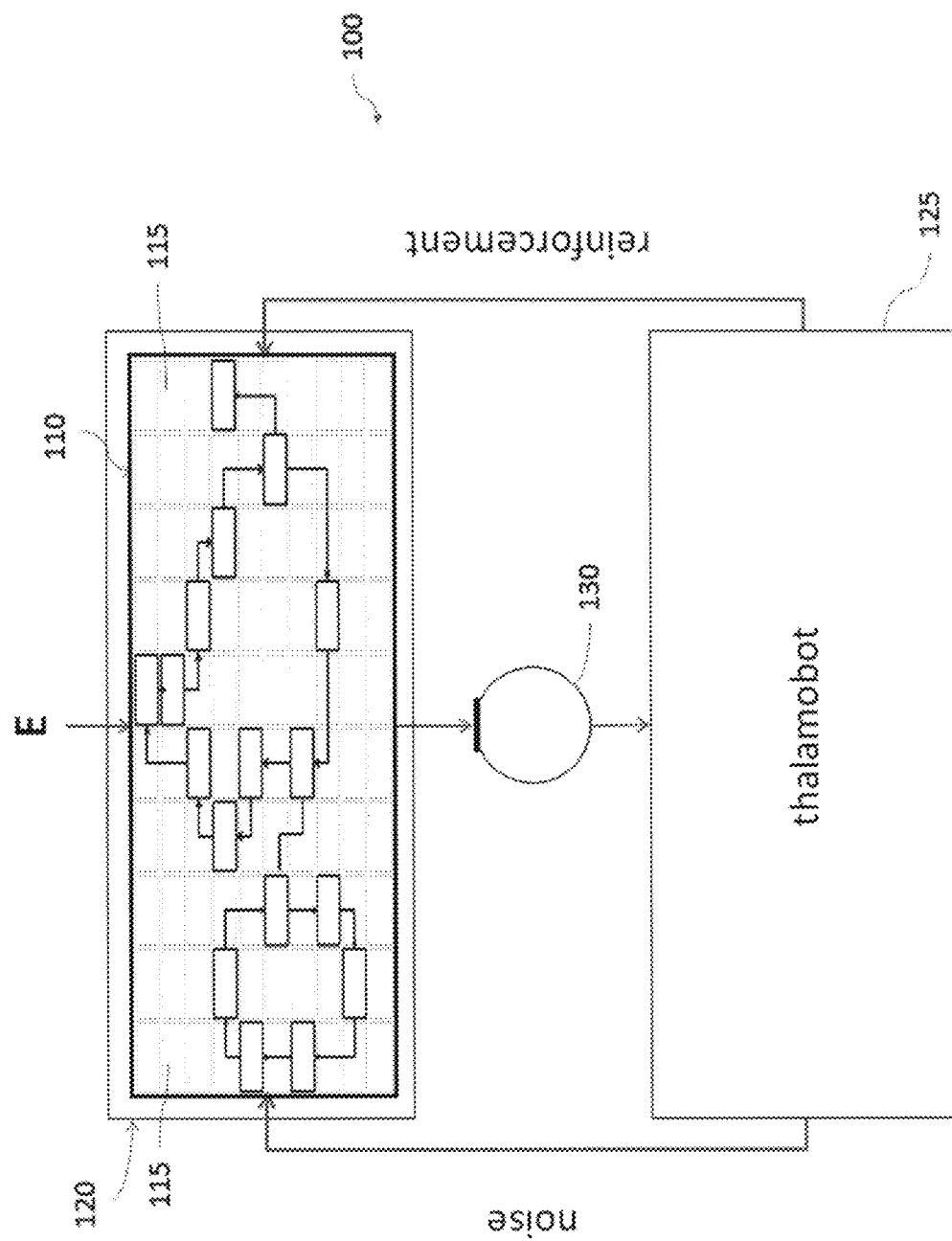
FIG. 1 is a block diagram of a system according to an embodiment of the present invention.

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

The following terms are defined to provide a framework for the discussion of embodiments of the invention:

Neural Module (115): an individual neural network in the form of an input-output mapping. Herein, adaptive multilayer neural modules have been used for proof-of-principle experiments.

Synapse/Synaptic
  Connection Weight: Numerically-based connections between neurons within a neural module or between neural modules themselves.
  Noise: Various forms of disturbances applied to any elements of an environmental modeling system, either in physical or simulated form. In a neural system, such noise takes the form of systematic or stochastic variation of weights, biases, or the internal functioning of neurons that affect synaptic integration or transfer functions therein. The definition(s) of noise from U.S. Pat. Nos. 5,659,666 and 7,454,388 are also incorporated herein by reference.

Reconstruction Error
  ("$\delta$" or "$\delta$ error"): The Euclidian distance between the input of an auto-associative Neural Module and its output ($|P_{in}-P_{out}|$). $P_{in}$ may also be referred to as "act," while $P_{out}$ may also be referred to as "act". Alternatively, the root-mean-square (RMS) variation between input and output patterns may be referred to as the reconstruction error.

Group Membership
  Filter (GMF): An auto-associative neural module that, when trained upon a group of interrelated patterns, can detect other patterns characteristic of said group based upon sufficiently low reconstruction errors. Alternately, such GMFs may serve as novelty detectors, indicating anomalous input patterns on the basis of sufficiently large reconstruction errors.

"Naughto-Associative"
  Nets: Neural module(s) with equal numbers of input and output nodes that may absorb memories of patterns representative of some genre while spoiling the formation of memories that are not members of said genre. Memories are formed by training upon identical input and output patterns, while amnesic function of this net is achieved by applying input and output exemplars during training that are is complements of one another.

Compound
  Imagitron (110): For the purposes of this disclosure, a plurality of neural modules or sub-networks that are constantly connecting and/or disconnecting to form associative chains and loops.
  Perturbation Cycles: Imagitrons are typically perturbed by randomly selecting network elements such as synaptic weight connections and varying them, thereafter relaxing said network elements to their original states. Each such sequence of perturbation and relaxation is called a perturbation cycle.
  Subliminal: Should ideational chains form within the compound imagitron, while critic nets are not attentive to them (e.g., when they are suffused with noise), they may be thought of as "subliminal." This perspective drives home the fact that ideas are always forming within cortex outside the purview of supervisory portions of the brain as in the process of subconscious mental incubation or latent idea formation.
  Thalamobot™ (125): Collection of neural modules and hardware that are capable of locating and distinguishing between memories and ideas forming between multiple neural modules. The chief mechanisms for detecting ideational vs. memory-like chains consist of novelty, determined through change detection (e.g., auto-associative filtering), and the detection of the rhythm of pattern activations (e.g., fractal dimension) therein. Temporal distribution functions and other mechanisms are potential alternatives to fractal dimension; of primary importance is that pattern turnover becomes slower and more sporadic when novel pattern generation is taking place, in the most extreme case taking the form of just one isolated and fleeting pattern of neural activation within the imagitron. The thalamobot may also consist of a hetero-associative neural network monitoring raw, unfiltered chaining/activations within an imagitron through a sensor.
  Latent Memory/Idea: Transiently forming ideational chains of adaptive neural modules become latent memories since pathways have been worn between them, making the chain more likely to activate again with the presentation of similar environmental patterns or internal noise. This process is taught in experiments in which the sub-networks are auto-associative, each becoming hetero-associative as they adapt their weights to bridge neural modules activating into disparate activation patterns, such patterns typically induced through various forms of perturbation applied to these modules. Alternately, this process is taught via the strengthening of broadcast channels between auto-associative modules based upon the delta error resonances between them, or the use of associative memories that coax modules into previously formed chains, or to depart from such established chaining patterns.
  Supernets: Compound networks of neural modules that spontaneously form from a matrix of neural modules due to both impressed noise and learning. Herein chains, networks of networks, and supernets are synonymous.
  Associative Gestalt: The use of various topologies of interconnecting neural modules as a figure of merit for other such topologies representing candidate ideas or action plans. In effect, the monitoring component or thalamobot, is basing its response upon the shapes forming from chaining neural modules and/or the locations of such shapes as depicted by the output device.
  Environmental Model/Model: A system that has discerned the entities and/or relationships between said entities after cumulative exposure to said environment, automatically forming token representations of said entities and/or relationships.

System Structure: FIG. 1 illustrates a block diagram of an example system according to one embodiment. As can be seen, the system 100 includes a compound imagitron 110 that is comprised of a plurality of neural modules 115, which serve as the equivalent of a hidden layer within a multilayer perceptron. The imagitron 110 may be thought of as a model or replica of an environment. Environmental inputs, E, are fed into the imagitron 110, which forms an intermediate stage between the environment and the input device/thalamobot 130/125. Non-limiting examples of environments include musical notes, brain scans, video feeds (such as from security cameras, etc.), natural language, packet capture from local and wide area networks, as well as router tables therein, behavioral spaces of robots and control systems, databases, abstract conceptual spaces, etc. This imagitron 110/neural modules 115/hidden layer may be implemented in a first computer system, or a first set of computer systems. Resulting neuron activations or $\delta$-error (or $1-\delta$, for instance) of these neural modules 115 may be output via an audio/ visual output device (shown in FIG. 1 as an output device, 120), which may be an LED monitor or other video or audio display, for example. An input device 130, such as a camera, is employed to monitor the output device 120 and track the resulting δ-errors and/or neural activation chains. The acquired hidden layer δ-errors or chaining topologies are then passed through the remainder of this compound perceptron, which may be implemented on a second computer system or second set of computer systems (referred to herein as the client or thalamobot 125). The thalamobot 125 may be capable of triggering learning or adjusting noise levels within itself or within the imagitron 110. Such triggering of learning may be achieved by allowing the thalamobot 125 to increase learning rate and/or momentum within the neural modules 115 of either the imagitron 110 or thalamobot 125.

While the embodiments described herein refer to an output device 120 that is a video display, it should be understood that such an output device 120 may incorporate any detectable encoding scheme. In one embodiment, the output device 120 may create a virtual reality environment, thereby allowing the thalamobot 125 to not only translate and rotate its perspective along the x, y, and z axes, but to also "fly" through the virtual reality representation of the neural system in depth. In such embodiments, the thalamobot 125 may be implemented as a virtual input device or camera in the virtual reality environment the inputs of which are processed by thalamobot algorithms. In other embodiments, the output device 120 may be truly parallel arrays of lights, for examples, LEDs, or laser-based imagitrons, i.e., an optical neural network. An auditory equivalent output device could emit concurrent frequencies that are frequency filtered by the thalamobot. Likewise, the output device 120 may generate concurrent electromagnetic signals. As will be understood, substantially any form of output/detection may be used. However, it will also be understood that the input and output devices preferably refer to more than merely a circuit of electronic components in direct electronic communication with one another (insofar as such a structure could be called an "input" and an "output"). This is not to say, of course, that such output/detection hardware is generic or common with neural systems. For ease of reference, input device 130 will be referred to herein as a camera, and output device 120 will be referred to herein as a video display. However, these are again merely non-limiting examples.

Furthermore, in yet other embodiments, there are no input or output devices 120, 130. Instead, the respective subsystems 110 and 125 communicate within the confines of a single computer system or between such machines. Individual neural modules 115 may run on their own dedicated processors, making this a novel means of computing.

Thus, a particularly attractive way of avoiding the above discussed processing bottleneck of prior art neural systems is to display the neural activation state of the neural modules 115 of the imagitron 110 while using the input device 130 attached to the thalamobot 125 to detect the evolution of activations/chains/reconstruction errors of the neural modules 115 (e.g., at approximately 30 frames per second or more). At least one filter, which may be an adaptive anomaly filter, running on the thalamobot 125 may selectively pass only those activation patterns that include state changes from a previous cycle (e.g., newly arising data and/or data that is "unusual"). Equipped to evaluate the temporal turnover of these anomalous patterns, the thalamobot 125 may isolate those regions of the imagitron 110 evolving novel and potentially useful patterns of activation. If the chains representing these ideas connect with modules 115 predicting reward or benefit, the thalamobot 125 could trigger learning among the modules 115 so as to strengthen the chain embodying a promising notion, thus committing this freshly formed idea, possibly along with its evaluation, to memory. The thalamobot 125 may also raise or lower the level of noise introduced into the collection of modules 115 constituting the imagitron 110.

In one embodiment, multicore processors may be used to implement the chaining of neural modules 115, with each processor implementing its own initially auto-associative neural module. In other embodiments, individual processors may implement multiple neural modules 115. An off-board thalamobot 125, on a separate machine or processor, may determine the value of chains as they form, to trigger their strengthening and/or weakening.

Figure 2:
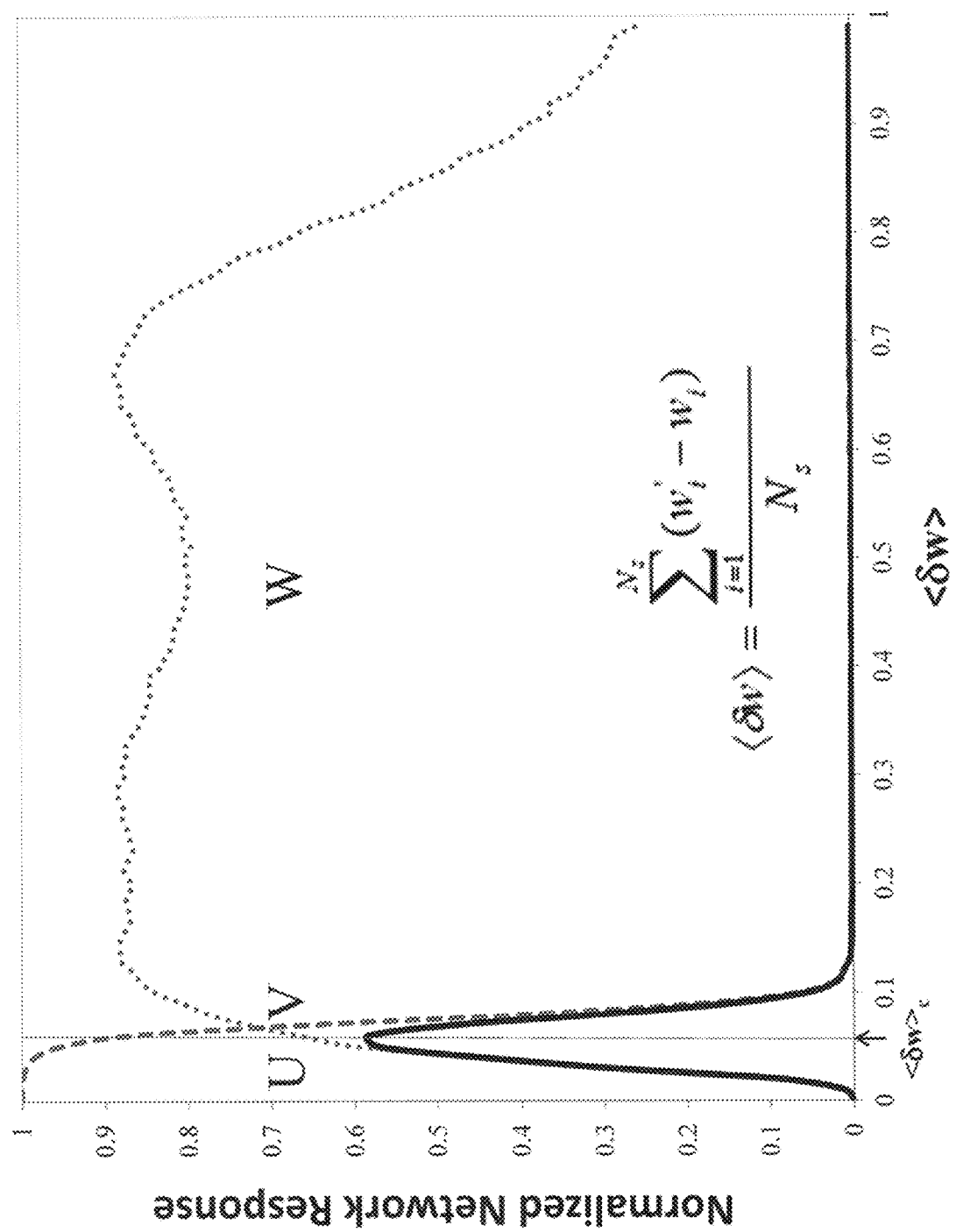
FIG. 2 is a graph showing the response of a trained neural network to internal, synaptic perturbation.

Rhythm & Novelty: Recent discoveries have shown that stochastic forms of noise applied to the synapses of an artificial neural system control both the rhythm and novelty of its pattern turnover (Thaler, 2014). FIG. 2 illustrates a representative response of a neural system to increasing levels of mean stochastic synaptic perturbation, <δw>. Here, <δw> is defined as mean variation of weights from their trained-in values during any given perturbation cycle in which positive disturbances of equal magnitude are randomly applied to each of the net's weights:

$$\langle \delta w \rangle = \frac{\sum_{i=1}^{N_s}(w_i' - w_i)}{N_s}$$

with $w_i$ representing trained in weight values and $w_i'$ representing their transiently perturbed values, and $N_s$, the number of synapses in the neural system.

The dashed line of FIG. 2 represents the probability of an intact memory being produced by such weight variation. The dotted line is the overall rate of pattern generation. The solid line is the rate of memory generation—the product of the previous two curves. As can be seen, memory turnover driven by such connective disturbances (solid curve) peaks at a critical level of mean synaptic perturbation, <δw>c. At lower synaptic perturbation levels below this peak (region U), pattern turnover consists largely of memories. Over a small range of synaptic perturbation just above this peak (region V), the neural system outputs mildly false memories that are reminiscent of the intact memories absorbed within its nets. Because of such plausibility, this regime is enriched in potentially useful confabulations that a computational critic can potentially mine for useful solution patterns as in U.S. Pat. Nos. 5,659,666 and 7,454,388. At higher values of average synaptic perturbation level, region W, the net activates into nonsensical patterns relative to the patterns learned by the net and as such, rarely offer value or utility to a monitoring critic. Therefore, one scalar metric, the mean synaptic perturbation level, <δw>, seems to control not only the rate of pattern generation by a synaptically perturbed neural system, but also how novel and potentially creative those patterns are.

A particularly useful observation gleaned from cumulative experimentation with the above mentioned two US patents is that when these neural systems start to generate novel and potentially useful activation patterns, their output becomes slower and more sporadic. Fractal dimension, DO, of these output streams, typically drops as the critic algorithm raises mean synaptic perturbation from <δw>c into the V regime. Using the quiescent clone of a synaptically perturbed auto-associative net as a novelty (i.e. □=|act−act'|) selective filter for output patterns of the perturbed net, we may establish a relationship between frequency, fractal dimension, and novelty of pattern streams seeded upon the stochastic disturbances within the former net. Thus, we find both theoretically and experimentally that as the imagitron 110 begins to evolve novel patterns, the frequency of pattern generation drops and becomes more sporadic relative to memory generation, the latter measured through fractal or zero-set dimension, D0.

Figure 3:
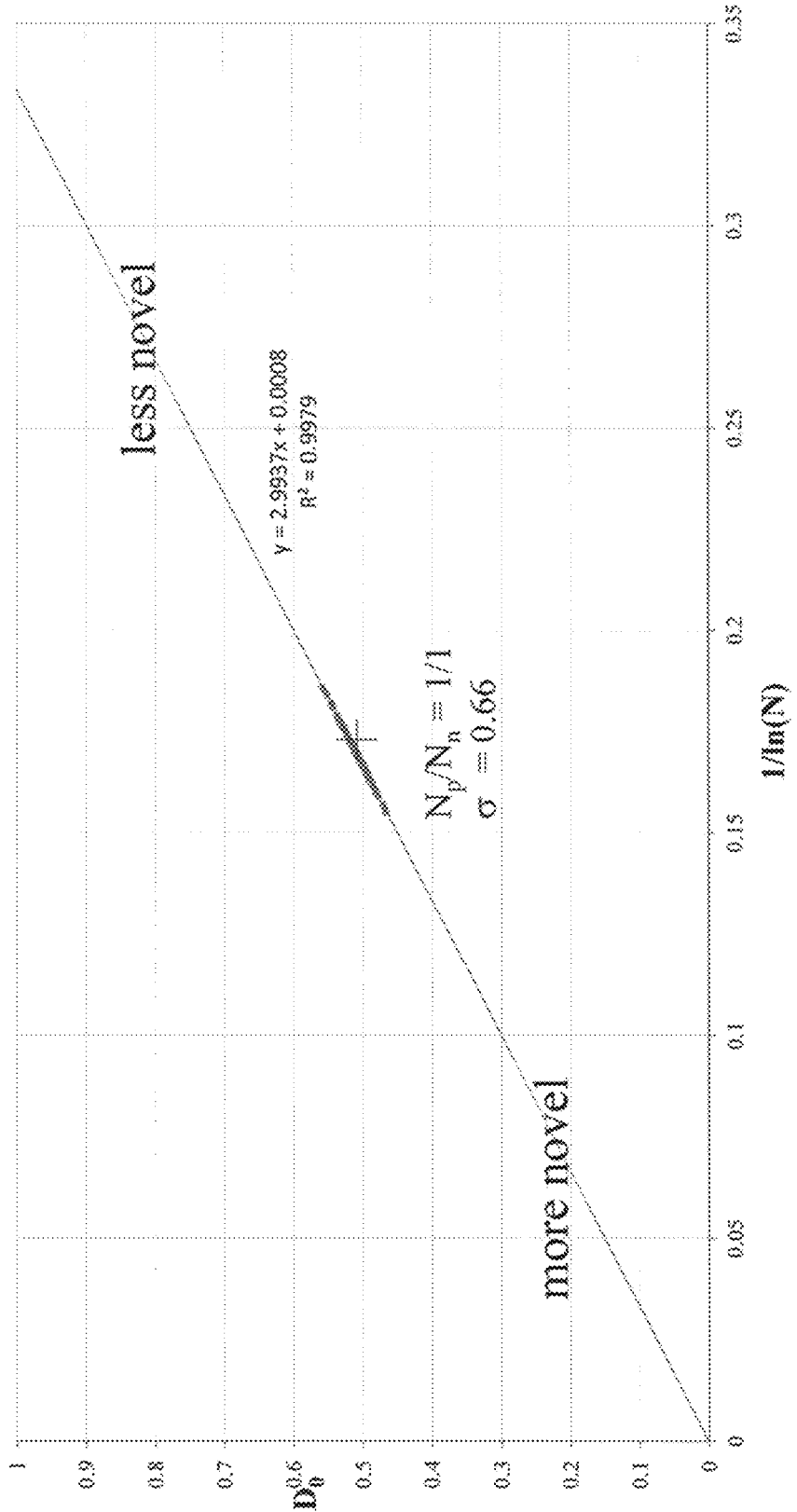
FIG. 3 is a graph showing the response of a synaptically perturbed, trained neural net in terms of fractal dimension, $D_0$ of the net's pattern turnover, versus $1/\ln(N)$, where N is the number of perturbation cycles required to produce a constant number of different output patterns.

The low frequency and tentativeness of pattern delivery, as mean synaptic perturbation is raised, may be exploited by the thalamabot 125 as an indicator that the imagitron 110 is generating novel patterns rather than intact memories. This is shown by the graph of FIG. 3, in which D0 is charted against 1/ln(N), and the more novel and less novel pattern generation areas of the graph are specified. Here the ratio of synaptic perturbations and the number of neurons, Np/Nn, has been held constant. To generate this graph, the number of perturbation cycles, N, that a synaptically perturbed network required to generate a fixed number of successive output patterns, N0, was measured over a number of trials, along with the fractal dimension, D0, of the rhythm of pattern stream accompanying each of these trials. It was found that D0 (a measure of linearity of the pattern stream) increases as 1/ln(N). This relationship is confirmed through both random walk theory and statistical mechanics (Thaler, 2014). Summarily, less novel output streams are generated at more linear rate (high D0). Thus, sporadic, non-linear pattern delivery signals novel pattern generation within such synaptically perturbed neural systems.

This low frequency and tentative pattern delivery is helpful, but is not a sufficient indicator of novel pattern formation. Therefore, if neural modules 115 are suffused with synaptic noise, the thalamabot 125 may observe which of these nets are involved in novel pattern generation by observing (1) how novel their output patterns are, and/or (2) whether the frequency of their output has slowed and become sporadic. Such temporal inhomogeneity of pattern output among these nets appears to be the result of local fluctuations in what would be assumed to be a uniform density of synaptic perturbations injected into the neural system at the command of the critic. It is noted that if the perturbed module is connected to a chain, the chain as a whole tends to flicker at the same rhythm.

Figure 4:
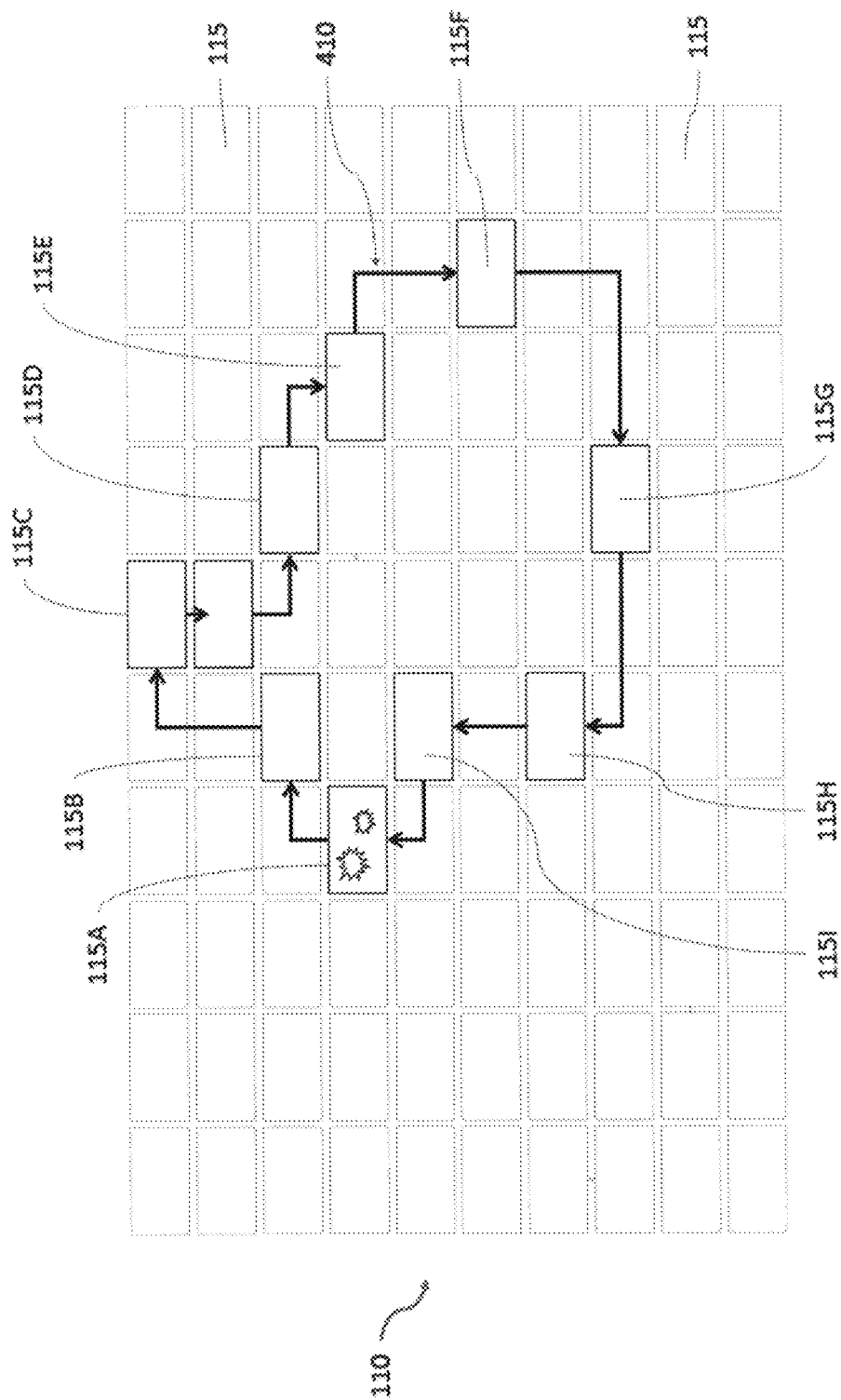
FIG. 4 is a schematic block representation of neural modules of an imagitron, in which a chain of neural modules has connected themselves as a result of an initial perturbation represented as starbursts.

In creating a brain-like neural system consisting of a plurality of neural modules 115, the situation is quite different from that of selectively introducing noise into one network while allowing a designated quiescent net to monitor its pattern turnover, as in U.S. Pat. Nos. 5,659,666 and 7,454,388. With no a priori notion of which of the modules 115 to perturb to produce a needed idea, potentially all networks are subjected to synaptic perturbation, with novel pattern generation detected either through anomaly filtering and/or the detection of sporadic pattern turnover within the neural nodes 115 of the imagitron 110. FIG. 4, for instance, shows an associative chain 410 forming among modules 115 as a result of a noise-driven pattern within a seed module 115A.

Common or complementary patterns have been found within a series of group membership filter ("GMF") modules that may be similarly isolated via the client/server system described herein. Such an associative chain 410 could represent a like-minded group or a teaming relationship of disparate mindsets. In more general terms, some of these modules 115 could be dedicated to binding other concept-generation modules 115 together to indicate the prevalence of modules co-activating (in a Hebbian sense). Alternatively, some modules 115 may be learning from the stochastic activation of others. The elements could be 4-note musical sequences that are compatible with one another, as judged by statistical sampling of popular music. As these note sequences chain themselves together, critics or client/server pairs as described herein may select the most interesting or appealing chains 410. The same can be said for words, where modules 115 connect to form sentences that are meaningful and in context, as judged by one or more perceptrons/critic nets.

Chaining Mechanisms: One non-limiting approach used to chain individual neural modules 115 relies upon so-called auto-associative neural nets serving as GMFs. Having trained upon patterns representing some genre or subject matter, they respond or 'resonate' to related patterns by generating a low reconstruction error $\delta$. Thus, as can be seen in FIG. 4, if a given 'seed' module 115A generates an output pattern (due either to an input pattern applied to it, and/or to its internal perturbation shown as starbursts in FIG. 4), that pattern may be broadcast to other modules 115 in the system 100 until another module 115B resonates with that pattern through low reconstruction error $\delta$. In turn, the responding module 115B may broadcast its output pattern to other modules 115 until a third resonant module 115C is found, etc. In this modality, a chain 410 of similar memories forms. It has been found that such chains 410 often (but do not necessarily) terminate upon themselves to form closed loops.

If allowed to simultaneously train during the chaining process, the resulting chain 410 becomes strengthened as the memories within each module 115 come closer to one another. Then with subsequent application of low levels of noise to the system, such self-strengthened chains 410 become more likely to activate. In effect, a neural pathway is worn between certain modules 115 that collectively represent some complex notion or strategy. If all network modules 115 in the chain 410 are perturbed within the U regime of FIG. 1, then the chain 410 represents a potential discovery of the type U1U2 . . . UN. If the ith module within such an activation chain 410 enters the V or W regimes, it will be of the type U1U2 . . . Vi . . . UN or U1U2 . . . Wi . . . UN, respectively. Here, U, V, and W refer to the regimes of synaptic perturbation labeled in FIG. 2.

Another non-limiting variation upon the above similarity linking is hetero-associative bridging. When an intermediate GMF module 115E, which is being perturbed by the addition of noise, is found to resonate with the pattern output by a preceding module 115D, this intermediate module 115E may then seek another module 115F within the ensemble based upon its own perturbed output pattern. Due to such perturbation, the input and output patterns of module 115E will significantly differ. Once a third module 115F has made a connection with the intermediate module 115E, the intermediate module 115E may train to reinforce the hetero-associative map between the input pattern fed to it by a previous module 115D and its own output pattern fed to the subsequent module 115F. Cumulatively, such a module 115E specializes itself into becoming a bridging network to other network modules such as 115F within the ensemble, rather than expressing content in the form of memories or confabulations thereof.

To form relational chains (e.g., directed graphs, Bayesian nets, and Markov Chains), another non-limiting approach is a mixed auto- and hetero-associative bridging scheme. Individual network modules 115 are allowed to train upon input and output patterns representing both auto- and hetero-associative mappings. Subject matter would be encoded as 1s complement of a given pattern and the net trained to replicate that complemented pattern at its output layer. For example, a module 115G outputs a pattern (act). This pattern is then complimented (act') and transmitted to other modules 115. The resulting output pattern of node 115H (actH') is compared with act' to determine the reconstruction error δH thereof. If δH is below a threshold value, the original output pattern (act) is then fed into module 115H, resulting in a hetero-associative output of actH. In this way, extensive directed graphs would form that could be excited by the application of an appropriate seed pattern. It is also noted that such steps could occur in a different order. For example, the output of module 115G (act) may be broadcast before it is complimented. A resonating module 115H, whose output has a low reconstruction error δH with output pattern act may then be fed act', resulting in the hetero-associative output pattern actH'.

A network module 115 may also consist of both auto- and hetero-associative portions, the former serving to recognize pattern-based content they are familiar with, and the latter activating through stochastic means to generate an associated pattern that then seeks another module experienced with such content. As a non-limiting example, the hetero-associative portion of a mixed hetero- and auto-associative module 115H, may broadcast its output actH. The auto-associative portion of module 115I may produce an output pattern actI which has a low reconstruction error δ with the original input pattern actH, such that module 115I resonates with hetero-associative output pattern of module 115H. However, once it is determined that the auto-associative portion of module 115I is familiar with the broadcast content (actH), its hetero-associative portion may then be excited with stochastic inputs to produce an output pattern to be broadcast to all modules 115. In effect, this network module 115I would redirect 'flow' to other modules 115 depending upon the information activated within its auto-associative portion, followed by a broadcast of related content by its hetero-associative portion.

In any case, anomalous or sporadic activation chains 410 could be located, isolated, and evaluated by the thalamobot 125 for potential utility or value. Those chains 410 having positive or negative significance to one or more critics residing in the thalamobot component 125 or within the imagitron 110 itself could respectively be strengthened through reinforcement learning or weakened through stochastic noise applied during learning.

Modules 115 may be capable of Hebbian learning through chain strengthening, in which connections form between two modules i and j proportional to the product of some function of their simultaneous reconstruction errors (e.g., (½−δi)(½−δj)). For instance, the equivalent of back propagation among assemblies of GMF modules 115 may occur if some general function of δ, F(δ), (e.g., ½−δ) is considered its output signal. Then, weight updates between such modules may occur in similar manner to the back propagation weight update rule between individual neurons:

$$\Delta w_{ij} = \eta F(\delta_i) \frac{\partial}{\partial \delta_j} F(\delta_j) F(\delta_j)$$

where $\Delta w_{ij}$ is the weight or broadcast channel update between $i^{th}$ and $j^{th}$ GMF modules 115, η is a learning rate, and $\delta_i$ and $\delta_j$ are the reconstruction errors of the $i^{th}$ and $j^{th}$ GMF modules 115. The resulting weights may be used to bypass the need for exhaustive broadcasts between modules 115, since broadcast to target modules 115 are temporally prioritized according to the strength of the weight channel leading to them, resulting in more efficient pattern broadcast schedules. Alternately, numerical connection strengths may be formed between individual neurons within the modules, modulated in proportion to the weightings developed via the above equation.

The converse of chain strengthening is chain breaking. If an undesirable chain is recognized, even as it is forming, one or more linked modules may be signaled to complement their output pattern during training so as to spoil their reconstruction errors, δ, and hence their auto-associative mappings for a particular input pattern. This leads to the dissolution of the chain. Thereafter this so-called "naughto-associative net" will not respond to the same input pattern or patterns, thus detaching itself from any network module broadcasting such a pattern or group of patterns to it. Alternately, noise levels may be elevated during training so as to cause the targeted modules to learn the noise patterns and forget their stored memories.

Cumulatively, associative chains within system 100 become unique to a particular environmental feature so that the chains, loops, and supernets 410 repetitively forming become token representations of environmental or noise-activated patterns, in analogy to the hidden layer activations of a multilayer perceptron that are interpreted by downstream layers. Using one or more input devices 130, the interpretation of these chains 410, especially in their visual presentation, becomes tantamount to object recognition in the physical world. One example scheme utilizing acoustic sensors involves the use of different audible tones having characteristic frequencies and durations for each portion of the display (e.g., x coordinate represented by frequency, and y-axis, duration). Novel chains may be detected through low frequency, sporadic pulses characterized by such frequencies and durations.

Figure 5:
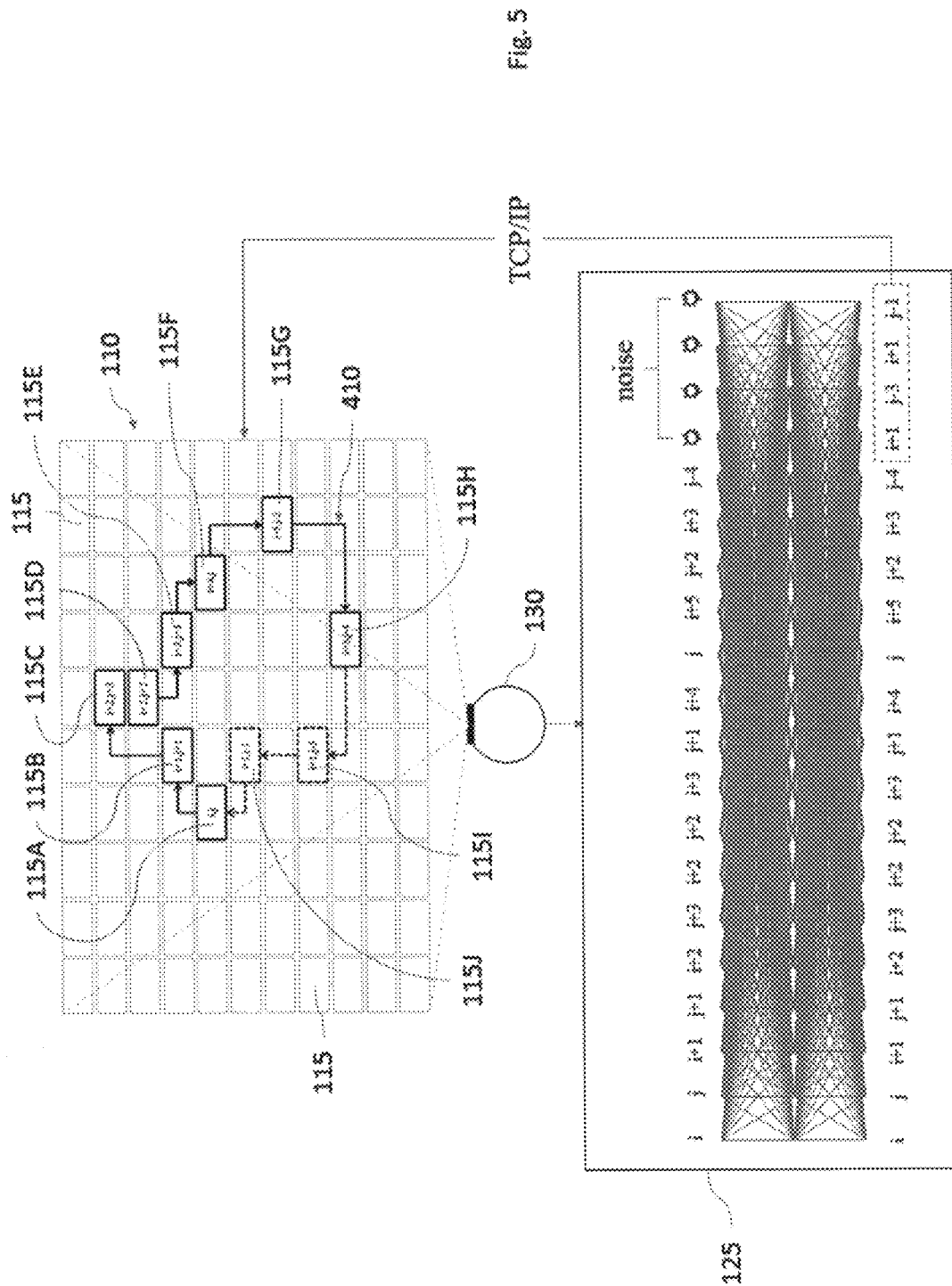
FIG. 5 is a schematic block representation of a system in which a thalamobot incorporates an associative memory that helps to complete the chaining pattern within the imagitron, based upon prior learning.

Use of a Thalamobot In Chaining: As noted above, a thalamobot 125 may take an active role in chain formation, such as by breaking chains, reinforcing chains, etc. Additionally, as shown in FIG. 5, a thalamobot 125 (with spatial and temporal filters not shown) may be used to suggest and influence chain formation as well. A thalamobot 125 may detect the activation of any first neural module 115A and use an onboard neural system, in the form of an associative memory, to determine which of the remaining modules 115 first module 115A should link to, repeating this process for subsequent states of the growing chain. This process can sidestep some or all of the need for general and inefficient broadcasts to all neural modules 115, since the neural system residing within the thalamobot 125 can, at any stage of chain growth, prioritize the order of broadcasts of the last pattern output by the chain 410 to the most likely recipient modules, as is depicted in FIG. 5.

In FIG. 5, eight neural modules 115A-115H have chained together within the neural collective as the thalamobot 125 observes this process through any combination of input devices 130 anomaly and rhythm detectors. Within the thalamobot 125 may be a neural network based associative memory that has cumulatively learned past neural chains 410 forming in the collective as the entire ensemble of modules 115 is suffused with noise. Therefore, given a partial associative chain or supernet, the thalamobot 125 may suggest one or more alternative ways of completing the chain 410 based upon the stochastic excitation of input nodes of said associative memory to supply the missing elements of the sequence of chaining modules. As a non-limiting example, in FIG. 5, the thalamobot 125 may have previously learned that nodes 115I and 115J are likely candidates for completing the chain 410. Once those candidate modules 115I, 115J have been determined, they may be conveyed to the neural collective in the imagitron 110 to determine the order of broadcast of the last pattern in the chain 410 to the neural modules 115 identified by the thalamobot 125. It is noted that all stages of associative chain formation may be governed in this way, starting with the activation of a first seed module by noise. The thalamobot's associative memory could be continuously training upon chains 410 as they are forming so that they may later supply the identities of candidate modules to complete any chain that is forming.

The Thalamobot: Looking to the mammalian brain, its underlying reptilian brain, in particular the thalamus, is able to locate and focus upon notions as they form. As noted above, research (Thaler, 2014) indicates that the foremost affordances that may be used to identify novel pattern formation are (1) auto-associative novelty filters that may isolate patterns having threshold novelty value, and (2) the rhythm with which such patterns are forming. It is strongly suspected that thalamus functions in this way, constantly taking in a digest of cortical activity, sensing anomalies, and focusing in on areas producing slow, hypnotic, and tentative output, the signature of original ideas forming (Thaler, 2014).

Figure 6:
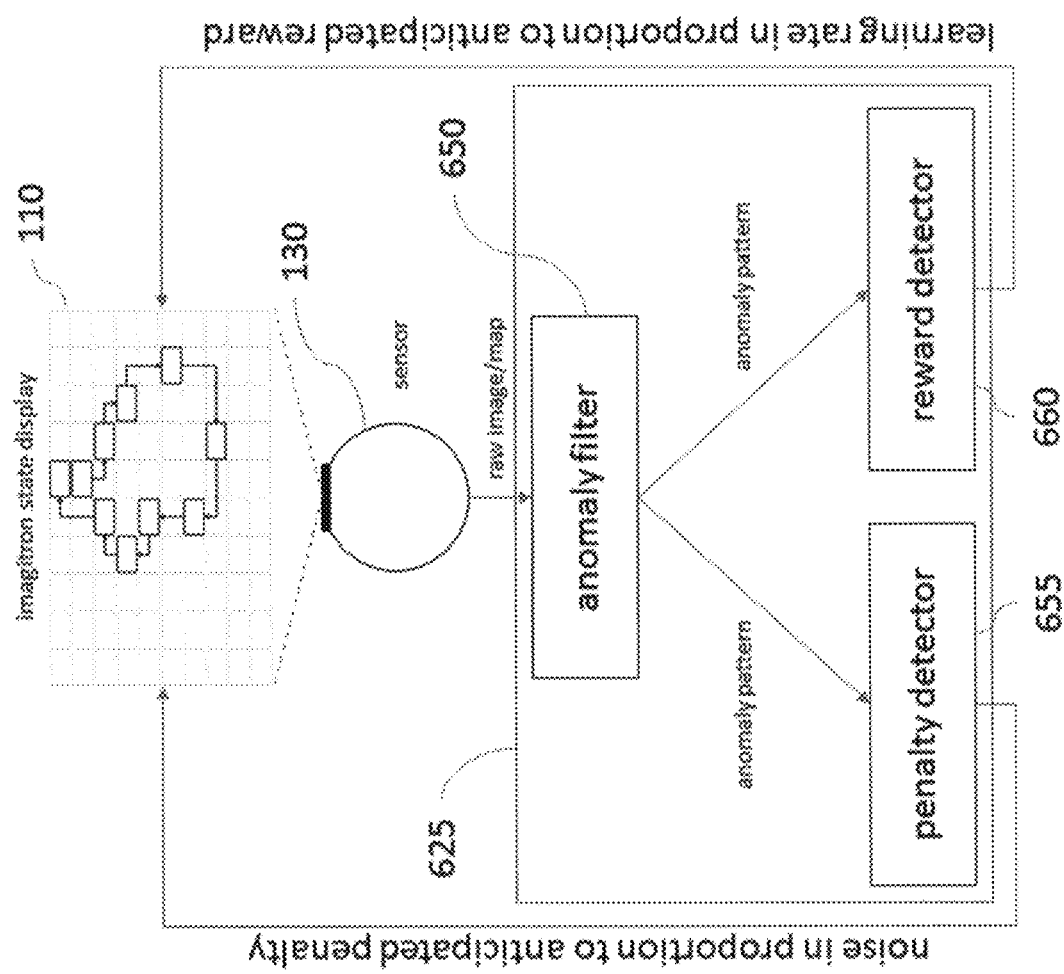
FIG. 6 is a block diagram of a system in which example components of a thalamobot are shown.

FIG. 6 illustrates a block diagram of one example of a simple thalamobot 625, which is in communication with a sensor 130 monitoring an imagitron 110 (both as discussed above). As sensor 130 acquires data by monitoring the imagitron 110, a raw image and/or acoustic map, for example, is fed into an anomaly filter 650 of thalamobot 625. An anomaly filter 650 may be an auto-associative neural net that habituates to repeating activation patterns from the imagitron 110, or may be an alternative algorithm (e.g., frame subtraction). Anomaly filter 650 highlights fresh activation chains 410, and passes anomalous patterns to one or both of a penalty detector 655 and a reward detector 660. A penalty detector 655 may be a neural net that maps raw chaining patterns with patterns representing associated past costs or penalties. As can be seen, penalty detector 655 may cause adjustment of noise levels within imagitron 110 resulting either in stimulation of novel chains 410 by raising noise levels, or the breaking of unwanted chains 410. A reward detector 660 may also be a neural net that that maps raw chaining patterns with patterns representing associated rewards or benefits. As can be seen, penalty detector 655 may lower noise levels within the imagitron 110, as individual modules continue training and linking within a more quiescent environment allowing the strengthening of meritorious chains 410 therein. Meritorious (or "useful") chains may be newly forming ideas, rehashing of recently formed memories/chains that demonstrate a factual association.

Figure 7:
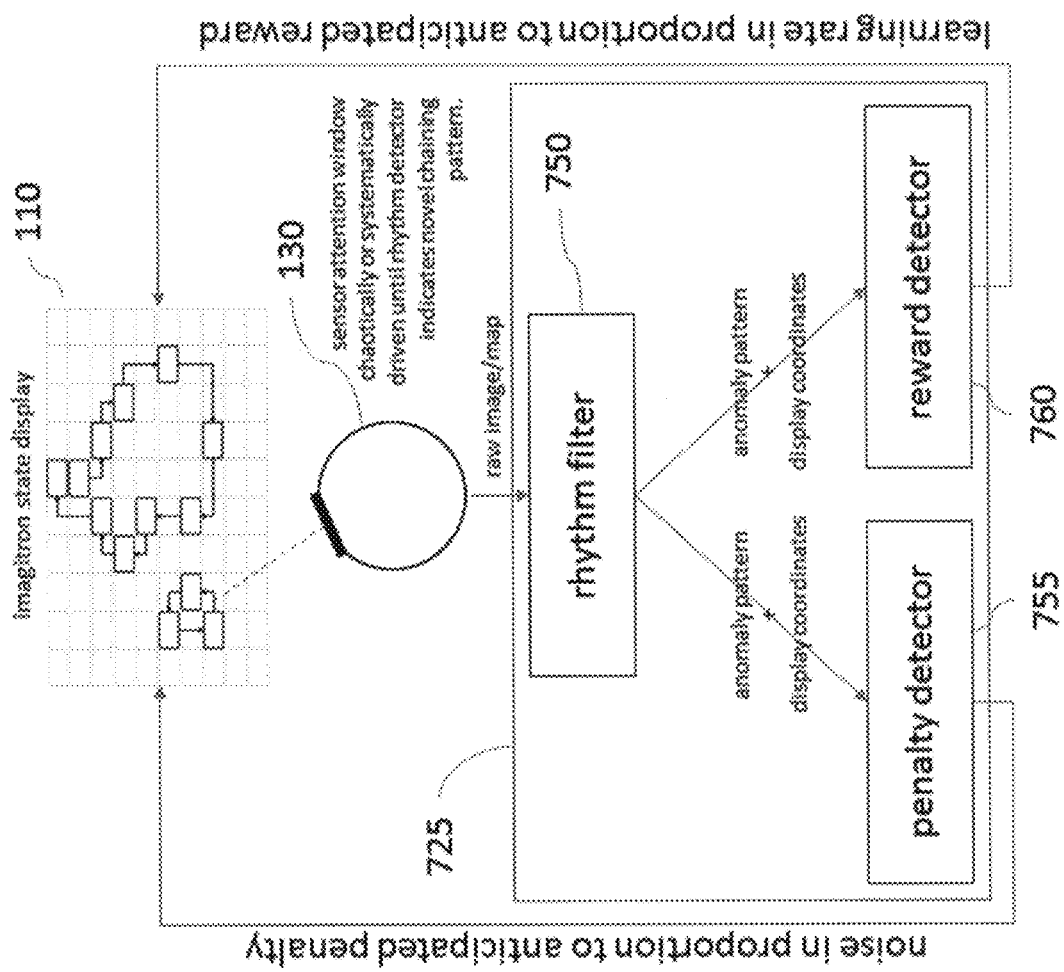
FIG. 7 is a block diagram of a system in which other example components of a thalamobot are shown.

FIG. 7 illustrates a block diagram of another example of a thalamobot 725—in this case a foveating thalamobot 725—which is in communication with a sensor 130 monitoring an imagitron 110 (both as discussed above). As above, sensor 130 acquires data by monitoring imagitron 110, and transmits a raw image or acoustic map, e.g., to thalamobot 725. However, the sensor 130 may have a sensor attention window which chaotically or systematically focuses upon different regions of the output device 120. Thus, a wandering attention window may be implemented, even with a fixed camera/input device. Rather than (or in addition to) an anomaly filter 650, thalamobot 725 includes a rhythm filter 750 which monitors frequency and fractal dimension of the pattern stream of imagitron 110. Rhythm filter 750 may instead calculate statistical temporal distribution of pattern formation in the imagitron 110. Rhythm filter 750 may cause sensor 130 to focus on a given area of output device 120 upon detection of novel chaining. Patterns may then be passed from rhythm filter 750 to one or both of a penalty detector 755 and a reward detector 760, as discussed above. A thalamobot 125 may also include other modules, such as:

Novelty filter: may be implemented as an auto-associative neural net that has absorbed memories of past activation patterns within the imagitron 110 and is able to detect false or novel memory generation therein.

General ANN Mappings: may capture any mapping relationship between activity presented by output device 120 and other pattern-based metrics. In a broad sense, a mapping system may detect states of neural modules 115 within the imagitron 110 (as monitored by the input device 130), and may map such states to a predetermined output pattern.

Timers: may track the number of cycles of perturbation of the imagitron 110, and may increase perturbation level in proportion to elapsed time to emulate frustration.

Noise Injectors: simulate global or more localized neurotransmitter release within the imagitron.

Implementation Systems: translate imagined notions or action plans activating within the imagitron into real-world strategies or modifications to the system as a whole.

Foveators: as described in U.S. Pat. No. 7,454,388, a perturbed net may generate successive positions to place an attention window within the output device 120 until a critic net detects spatial or temporal anomalies within the window. Thalamobot 125 attention may then gravitate toward such anomalies, as noted above.

Flatteners: may be implemented as an auto-associative net that flattens 2-D or 3-D representations of activation chains 410 into 1-D patterns. These nets may be used as associative memories to coax the completion of chains 410 within imagitron 110.

Buffers: may be used to track the time evolution and hence chronology of activation chains 410 output via output device 120. Such 1-D patterns may then be applied to the penalty/reward detectors 655/755, 660/760, to which ordering of events may be meaningful. Thus, buffers allow the classification of chains and supernets 410 of neural modules. Within a multilayer perceptron, the activation of hidden layers serves as the classification of any pattern applied as an input to the net, typically without regard to the order with which such neurons activate therein. Within the imagitron 110, chains and networks of neural nets (rather than individual neurons) serve as the classification that in turn is sensitive to the order with which these modules are incorporated into a given chain. Such order dictates the topology of the chain and may be discerned by filling a buffer or stack with the identities of the modules in the order with which they link together. In effect, the thalamobot 125 classifies 2-D (e.g., flat panel display) and 3-D (e.g., virtual reality depiction of imagitron 110) shapes formed by the chaining neural modules.

Audio Frequency Detectors: if the output device 120 is frequency/duration coded to coordinates in the output device 120, a neural net may be used to convert such audio signals to such coordinates and direct the attention window of thalamobot 125 to the appropriate region of the output device 120 or a particular output device 120 among a plurality thereof.

Three general but non-limiting modes of operation are presented, characterized by the level of noise injected into the imagitron 110. In the first, data patterns are fed from the environment, E, into imagitron 110 without noise or learning. Passive discovery occurs as the thalamobot detects anomalous chains forming as a result of such applied environmental patterns. At a later time following such baseline training, a new data pattern may be introduced from the environment into the imagitron 110 in the presence of a relatively low level of noise. The system would thereby generate alternative interpretations of the environmental input, which could be coaxed via perturbation introduced by the thalamobot 125 into a consistent interpretation and then frozen in as a memory through triggered learning. Contextual discovery, disambiguation, and sense-making occurs. After sufficient learning, the system could be allowed to freely "dream" as a result of higher levels of noise injected by the thalamobot 125 to find new associations of value or utility. This is so called "eyes shut" discovery and invention which is typically inattentive to environmental input patterns.

Research (Thaler, 2014) indicates that idea formation in the brain may involve myriad neural modules, some of which may be chaining their noise-seeded output patterns into complex notions, while other critic modules (discussed below) are chaining the activations of their own neural modules into complex associations that likely represent the affective response (i.e., emotional effect) within the brain to such notions. Inevitably, such affective chains 410 will recruit modules 115 that encode either existential threat (i.e., penalty) or opportunity (i.e., reward). They in turn may trigger specialized modules 115 that globally secrete neurotransmitters either increasing synaptic noise level (stress) to create anomalous activation patterns or decreasing such noise (relaxation) to allow learning and perception of newly formed ideas.

Once a module 115 or a chain 410 of multiple modules 115 have formed a potential idea, other chains 410 of neural nets 115 finding relevance to the notion will be driven at the same frequency as the module(s) 115. Operating above the abovementioned critical point, they will manifest a rhythm of pattern generation that is slow and sporadic, the telltale signature of neural nets generating novel concepts and strategies. Within a vast assembly of many neural modules, some means must be provided to locate and concentrate upon the notion as it forms, triggering reinforcement learning as a meritorious concept is chaining up or, if not meritorious enough, erasing it through the release of stress neurotransmitters. In the latter case, erasure of memories takes place as the networks train on random patterns. As noted above, present day computational platforms tend to bog down as the number of neural modules 115 increases in an imagitron 110. Modules 115 output patterns seeded by noise, are constantly learning, and continuously chaining to form compound notions and the equivalent of emotional responses to these ideas. To condense such activity for another computational entity to evaluate, a summary of synthetic cortical state would need to be conveyed to a critic system in a serial manner, creating a significant bottleneck in identifying valuable ideas as they emerge.

A thalamobot 125 which is capable of globally monitoring the neural activation state of the entire imagitron 110 assembly of neural modules 115 in visual (or other) format is a particularly attractive way of avoiding this bottleneck. In one experiment, 10,000 auto-associative, multilayer neural network modules 115 were generated that formed memories of randomly generated byte patterns. When an input byte was applied to all such group membership filters in this array, their resonances with the input pattern were measurable by a reconstruction error ($\Box\Box$ that could in turn be displayed as gray scale values between 0 and 255, equating to a $\Box$ between 0 and 1, on the monitor. In effect the auto-associative filter array acts as a compound classification layer within a multi-layer perceptron, with each 8/4/8 auto-associative network therein activating with a $\Box$ error somewhere in the range of 0 to 1. The input device 130 (in this case, a camera) and thalamobot 125 then read such activations and used its portion of the composite multi-layer perceptron to map to an output pattern.

This architecture may be run adaptively so as to learn an overall input-output mapping. The thalamobot 125 allows the individual modules 115 to form deeper memories of the patterns that they resonate with. The thalamobot 125 may also adapt so as to improve the mapping between group membership activation errors ($\Box$s) and the desired output patterns.

The thalamobot 125 may also be able to recover latent ideas that form within the imagitron 110 as associative chains and networks 410 of networks 115 that form therewithin. Noise (e.g., synaptic perturbation) activates memories within connectionist system that could be a swarm of adaptive artificial neural network modules 115. Thereafter, an association chain 410 develops incorporating certain modules 115 but not others, via the aforesaid chaining mechanism. These chains 410 may strengthen their association on their own, i.e., forming a latent idea. At the same time, an adaptive anomaly filter in the thalamobot 125 that has been cumulatively observing the swarm of adaptive artificial neural network modules 115 may have developed a normalcy model of how such modules routinely connect. This filter may be implemented integrally within the thalamobot 125 or as a sensor-based scanning system that monitors the activation patterns and/or connectivity of the swarm of modules 115. New associative chains 410 will be identified by this filter, essentially ignoring the more persistent activation states of those neural modules 115 unrelated to the novel associative chain 410.

Figure 8:
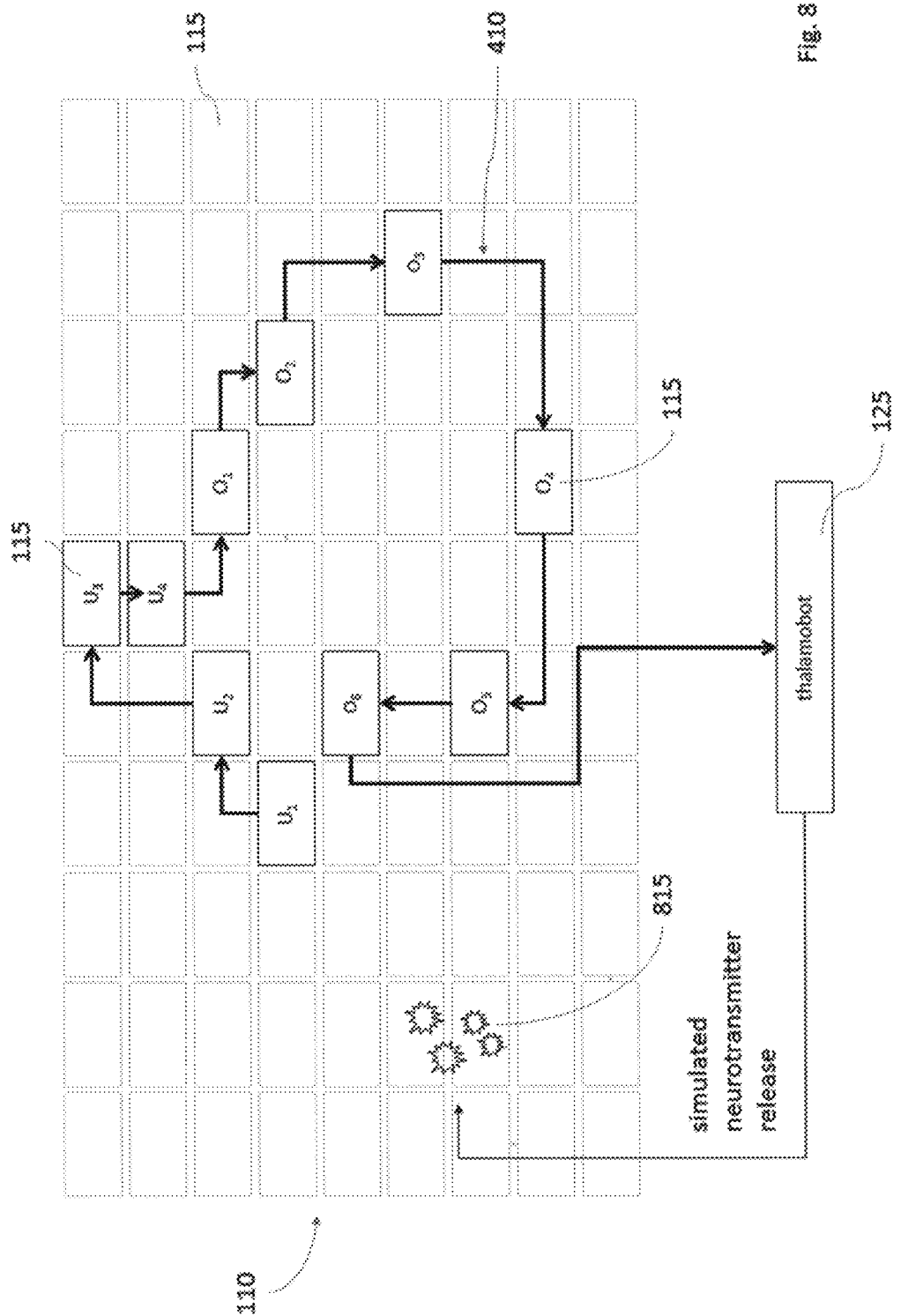
FIG. 8 is a schematic block representation of an example interaction between a thalamobot and an imagitron.

Critics that may be resident within the thalamobot 125 or scanning activation displays may be used to strengthen the connections within the associative chain 410 by (a) signaling the swarm to adaptively reinforce such links, or (b) train a proxy network to learn the connectivity within the connectionist swarm. In analogy to U.S. Pat. Nos. 5,659,666 and 7,454,388, the critic within the thalamobot 125 may take the form of specialized neural modules 815, shown in FIG. 8, that are capable of sensing penalty or reward for the system 100 as a whole, and raising or lowering the level of perturbation throughout the system. In FIG. 8, specialized neural module 815, which may be triggered by a forming chain 410, is shown within the imagitron 110, but it is noted that this specialized neural module 815 may instead be located within the thalamobot 125. When integral to the imagitron, an ideational chain or network 410 of modules 115 may link up (e.g., U1→U2→U3→U4), to form some concept that a perceptual or affective chain (e.g., O1→O2→O3→O4→O5→O6), may link to so as to render an opinion about the U1-U4 concept. Module O6 in this example integral to a strong positive association may trigger the thalamobot 125 to inject simulated reward-related neurotransmitters into the imagitron 110 via specialized neural module 815 so as to strengthen the entire chain 410. Similarly, if O6 is part of a negative associative chain, it may trigger simulated stress-related neurotransmitter release by the thalamobot 125 to strengthen or weaken the chain 410, or to induce the formation of alternative chains 410. Thus, such critic modules may be located within the imagitron 110 or thalamobot 125, and may serve as triggers for simulated neurotransmitter release.

Within any critic-based system, merit is generally judged by some metric that could for instance be the single numerical output of a simple hetero-associative net registering its satisfaction with any applied input pattern on a 0-10 point scale. Alternately, if figure of merit is pattern-based, then the utility or appeal of a network's input pattern might be the Euclidean distance of the net's output patterns from some desired target pattern. In any case, suitability of any input pattern becomes a scalar quantity that may be used to modulate various forms of influence within an imagitron 110 through the equivalent of stress-induced adrenergic neurotransmitter release or dopaminergic reward neurotransmitters preparative to learning.

The thalamobot 125 may therefore include—for lack of a better name—an associative gestalt detector (or "recognition system"). Such a recognition system does not necessarily compute a numerical measure of novelty, utility or appeal, but is instead on the lookout for sub-pattern geometries or topologies within the imagitron (or even in the thalamobot) formed as chains of neural modules 115. The thalamobot 125 may identify such shapes at specific locations within the collective (e.g., a circular chain centered at position x, y and radius r) as they form in reaction to some core ideational chain 410 which itself may also be viewed as a location, shape, or topology. Certain modules 115 within these reactive associative gestalt chains may serve as hot buttons that may trigger simulated neurotransmitter release either directly or through the thalamobot intermediary. If the core ideational chain 410 activates a subsequent associative gestalt chain whose location and/or topology encodes failure, the thalamobot 125 may inject noise into the imagitron 110 to spoil the ideation, as shown in FIG. 8. If the associative gestalt chain spawned by the core ideational chain 410 contains modules that singularly or collectively encode success, then the thalamobot 125 may trigger a hippocampal-like function of increasing learning rate and momentum in the imagitron 110 in proportion to the promise offered by said core idea.

This recognition system may be based upon a logical system that triggers with activation of any said hot button modules, or a neural system serving as a shape or topology detector searching among the chaining neural modules 115. In terms of structure, this system is not purposely introduced or engineered. Like the initial ideational chain it "carves" itself out of the matrix of neural modules. In the brain, certain modules that activate within an associative gestalt may be bound congenitally or through cumulative or episodic learning to neural modules specialized in volume or global release of neurotransmitters. In the present invention, volume neurotransmitter release is triggered by the recognition of such reactive chains or the by the activation of such a hot button module incorporated by said gestalt chain.

In this regard, it is noted that the term "gestalt" is meant to convey the notion that the associative chain 410 forming in reaction to any seed ideational chain conveys more than the information conveyed by any hot button modules 115 therein (e.g., the idea triggering the associative gestalt solves the problem, but it reminds the system also of notions x, y, and z, and the system lacks the ability to concentrate on all of these associated ideas simultaneously).

In the brain, the injection of noise would take the form of stress neurotransmitters such as adrenaline and noradrenaline, released by specialized neurons, and reward neurotransmitters such as serotonin and dopamine, should promising associative chains be formed. The utility of this mechanism is that as the thalamobot 125 watches the display of activations/reconstruction errors of the imagitron 110, it may sense the activation of a negative associative gestalt within the imagitron 110, which may signal the thalamobot to elevate perturbation levels within the imagitron 110 to create more 'twisted' notions, if need be, to solve a problem, when those already memorized fail to meet the demand. Similarly, associative chains 410 may be spoiled from forming by alert associative gestalts/chains 815 through elevation of synaptic noise into the W regime of FIG. 2. Alternatively, chains 410 linking to a positive associative gestalt/chain may trigger the equivalent of potentiating neurotransmitters to strengthen such compound notions.

Indeed, although others will be discussed below, it has been found that one technique for isolating newly emerging activation chains 410 using anomaly detection is to create swarms of GMFs within the thalamobot 125, each responsible for monitoring some region within the array of interconnecting neural modules 115 of the imagitron 110. In one embodiment, camera frames constituting the video stream may be divided into 8×8 pixel (24×24 byte) squares, each monitored by its own auto-associative net within the thalamobot 125. The camera frames may each come from a separate camera 130, or multiple camera frames split off from the output of a camera 130. Therefore, for a succession of 640×480 camera frames, 4,800 individual neural nets, having of the order of a thousand neurons each, would be training to form a status quo model of the modules they have been delegated to watch. This activity in itself bogs down most current day multi-core processor machines, thus reinforcing the desire for offloading this digest of the chaining state to another machine at a faster rate than could be achieved through serial protocols such as TCP/IP.

Alternatively, a thalamobot 125 may also operate by entering into a so-called "foveational" mode wherein one stochastically perturbed network generates a succession of positions to place an attention window on the display 120 depicting the chaining, as another net monitors for spatial or temporal anomalies within said attention window focusing upon some region within that display 120. Once such anomalies are located, the latter may attenuate perturbation level within the stochastic net, the result being that the attention window gravitates toward any spatially or temporally anomalous chain of activating neural modules. As noted above, the critic in the thalamobot 125 may introduce randomization of links so as to weaken such associative chains 410 should the associations (the latent idea) be deemed not useful, unappealing, or insignificant. An advantage of using a sensory output/input pair is the avoidance of combinational explosion in assessing the topology of network modules through a probing algorithm that is tracking through all connections in an imagitron 110. Another advantage is the asynchronous scrutiny of chaining neural modules, and the anomaly-rhythm filtering to prioritize freshly emerging associative chains on the basis of novelty.

As a non-limiting example, a swarm of 10,000 group membership filter modules 115 may be allowed to absorb memories of 10,000 random melodies of one measure, four notes, each. When one of these modules 115 is synaptically perturbed (or externally excited) it generates a 4-note theme that is then applied to all group membership filters 115 in the swarm. The group membership filter 115 containing the closest memory of this theme then produces a variation on this theme in the next bar or measure. As these notes continue to chain, they frequently loop back to the initial theme to form a closed loop, forming the basis of a novel melody. These chains 410 and loops would then be isolated so that their activations may be passed to a critic within a thalamobot 125. Again, the group membership filter swarm consists of 10,000 adaptive neural modules 115 continually chaining with their reconstruction errors or activation patterns, which may be portrayed on a monitor 120. A camera 130 viewing the monitor 120 relays the image to an adaptive, auto-associative neural network functioning as an anomaly filter in thalamobot 125. The thalamobot may operate on another computer or processor, and may constantly adapt to the neural swarm's activations/reconstruction errors. Only the latest activation changes may be revealed by this adaptive anomaly detector. Thusly extracted, these activation chains 410 and loops may be passed to various critics in the thalamobot 125.

An adaptive filter may be used to isolate freshly forming associative chains. When verifying the output of this application the temporal sequence of activations of group membership filters and general network modules is displayed. Allowed to fill a buffer or stack in this viewing order, the sequence may be passed to the critic. One or more of these critics may be a prosody detector, or a system for determining fractal dimension or other temporal measures.

A related aspect is the task of identifying novel associative chains 410 on the basis of prosody. Identification of novel associative chains 410 is achieved for the above musical example through the use of a prosody detector sensing the activation rhythm and/or fractal dimension of these chains 410 as they match that of their initiating/driving neural module(s) 115. An adaptive filter is used to detect low fractal dimension output with or without pre-filtering by a spatial anomaly detector. As noted above, such fractal dimension is calculated as $D0=\ln N0/\ln N$, where N is the number of cycles of stochastic perturbation of the swarm of neural modules to generate N0 successive patterns.

The method and device described herein are well suited for application in at least the following modalities.

First, sub-networks within a constituent system may be subliminally knit into a coherent, associative whole. For example, intact memory chains may be created. This modality is particularly useful in intelligence applications in which important relationships are established between tokenized neural representations of real world entities. In fact, anywhere one sees graph analyses and semantic networks, this technique offers many advantages. In this modality, multiple nets vie to capture and learn environmental input patterns. Thereafter, these nets may link either autonomously or through human guidance. Subsequent perturbation of the connections joining such nets may result in juxtapositional invention or inductive/deductive discovery chains. At low perturbation the output vectors of the nets remain within largely environmental features or exemplars, or knowledge domain, U, of the nets, generating factual knowledge, as discussed in the article "A proposed Symbolism for Network-Implemented Discovery Processes", Thaler, S. L. [1996], World Congress on Neural Networks (WCNN'96), (San Diego, CA), pp. 1265-1268, which is incorporated by reference herein in its entirety and a copy of which is also submitted herewith.

In a related modality, novelty chains may be formed. More specifically, juxtapositional associative modules are produced that incorporate elements, or combinations thereof, that have not been directly experienced by the system of sub-networks. Such are subjected to increasing levels of internal noise to soften network constraints and produce environmental-like features that differ from the training exemplars of the nets. The perturbations to the nets may be further increased to produce myriad unconstrained notions that generally fall outside of the knowledge domain of the nets. The basic process of perturbation of associative chains as utilized in the preceding two modalities is described in the 1996 Thaler article referenced in the preceding paragraph and "The Creativity Machine" Paradigm", Thaler, S. L. [2013], Encyclopedia of Creativity, Invention, Innovation, and Entrepreneurship, which is also incorporated by reference herein in its entirety.

In the case of the modality in which intact memory chains are formed, which in most cases may be auto-associative networks, the networks may alternatively be of hetero-associative design initially and subsequently interacting and chaining as referenced in the above discussion of the formation of intact memory chains. In a different vein, auto-associate sub-networks, for example, auto-associative nets, may be converted to hetero-associative mappings through learning.

One embodiment involves taking the output pattern from a given neural module, resulting from noise and/or input patterns to it, finding an auto-associative net within the swarm containing the nearest memory to that of the first net's output pattern, via reconstruction error (□) and then training the target net so as to make it map from the impressed to a subsequent pattern, the latter introduced either from the environment or from other neural modules. Any pattern introduced to the compound imagitron 110 from the environment, or from other networks internal to this imagitron 110, is allowed to propagate in parallel or serially through all or a portion of the ensemble of neural modules. The auto-associative group membership filter having the lowest, or some nominal reconstruction error, is the one within the ensemble holding a memory close to that of the applied input pattern. Thereafter, any new input pattern from the environment or from the ensemble of neural modules 115 is applied to the output of this targeted group membership filter as it is subjected to training cycles, making it a hetero-associative bridge between the input and output patterns it has trained upon. This process may be repeated to build up extensive associative chains from the original ensemble of auto-associative networks.

As discussed above, compatibility chains 410, for example, linking of similar or complementary memories into useful coalitions may be isolated with adaptation taking place within the nets comprising such chains so as to adapt the memories therein into closer compliance with one another. In one embodiment, a random or constant seed pattern is applied to a group membership filter module within the assembly whose output pattern is applied in turn to a multitude of other modules within the ensemble until another group membership filter is found containing a similar memory. Allowing patterns to circulate through these chains as the underlying group membership filter's train, the connections between modules effectively strengthen since tapped/recruited modules become more selective for the common memory (i.e., reconstruction error falls for the circulating pattern) and are more easily recruited when the governing algorithm searches once again for a compatible group membership filter. In the process, not only do associative chains form, but the memories within each of the group membership filter modules adapt so as to become more compatible with one another. If the output of any group membership filter module is complemented (e.g., $1-act_i$, where $act_i$ is the activation of any output pattern component), then complementary chains form. Of course, there are variations on this theme.

Auto-associative modules can be addressed as compound neurons. In this case, the reconstruction error of an auto-associative module is used analogously to the activation of an individual computational neuron in adaptive learning schemes. The weights feeding the inputs of the auto-associative module are updated in proportion to the reconstruction error □ (or its complement 1−□), the differential such as d(1−□□/dnet, and the current x (e.g., the □ or 1−□ from the previous GMF) being transmitted through them. Likewise, the auto-associative module's internal weights may be adjusted in proportion to some function of the reconstruction error.

In another modality, as multiple entities or activities present themselves simultaneously from the environment to the compound imagitron, their respective neural modules simultaneously activate, strengthening into a latent memory. This chain 410 will activate subsequently with the presentation of one or more of such entities or activities or spontaneously from noise internal to the imagitron 110. Such chaining may be achieved by starting with a collection of auto-associative nets. As subsequent nets resonate with environmental patterns they have formed memories of, they recruit a subsequent module's memories as their training output targets. In this way, the net effectively becomes a bridge mapping between one entity/activity and the next.

The next series of modalities address the detection and/or differentiation of associative chains 410 formed through one or more of the modalities described above. In a first such modality, audio-visual cues and prompts are used to attract attention of a thalamobot 125. It is envisioned that effectively any visual or auditory clues could be used to attract the attention of the thalamobot 125. For example, in one embodiment, the average color (encoding the mean activation of all its neurons) of any neural module within display offers an affordance. In another embodiment, different acoustic frequencies are used to differentiate which activation display is requesting attention of the thalamobot 125. The degree of novelty represented by the activation may be indicated through the intensity level of the audio-visual cues, for example, more tentative flashes or auditory report may signal the arrival of a novel thought taking the form of a novel associative chain.

Using the basic thalamobot 125 arrangement, newly arising chains 410 are detectable via novelty filters. This process minors that of a single multi-layer perceptron monitored by another for novel activation patterns. However, in this embodiment, the novelty filter is monitoring for newly arising associative chains 410 of neural modules 115.

The thalamobot 125 arrangement similarly allows for the use of prosody or rhythm filters to detect a succession of novel associative chains 410. Noteworthy associative chains are detected by processing of raw activation of the compound imagitron 110 and/or anomaly filtering as described in the immediately preceding paragraph.

The preceding concepts can be applied in the context of examination of Bayesian nets, graphs, semantic networks, Markov chains, associative memories and other connectionist schemes in which tokenized entities and activities are spontaneously interconnecting.

While the thalamobot 125 arrangement has been described through the implementation of artificial neural networks, the imagitron 110 and thalamic 125 subsystems may be implemented on separate hosts via a network connection. The described systems advantageously also allow for the management of associative chains 410 through noise injection and reinforcement learning.

In one embodiment, the system may trigger higher levels of synaptic and/or neural noise within the system of sub-networks in order to trigger generation of novel ideational chains 410. In another embodiment, the system may trigger even higher synaptic noise levels within the sub-networks in the event that the generated associative chains 410 are undesirable. The higher synaptic noise levels spoil the formation of the anticipated chain 410. In contrast, where the system identifies the formation of a desirable associative chain 410, the system may trigger reinforcement learning to strengthen the links between the component neural modules of said chains. In these embodiments, it has been found that the best arrangement for introduction of noise into the sub-networks to induce novelty and reinforcement of positively received associative chains 410 is to simulate the chemical diffusion of neurotransmitters.

An important capacity of the system is the emulation of the process of subconscious incubation of ideas that occurs in the brain. In particular, the entire system, both the compound imagitron 110 and the thalamobot 125, may undergo cycles of excitation and relaxation. The entire system is immersed in noise as latent ideational chains form in sub-networks of the compound imagitron 110. The noise level is then lowered, thereby allowing the compound imagitron 110 to visit newly formed memories as the now more lucid thalamobot 125 or other chains within the imagitron 110 identify those associative chains 410 having utility and/or value.

Yet another important capacity of the system is the emulation of subconscious incubation of ideas in which ideational chains form during periods of peak noise within the imagitron 110. As the noise level subsides under direction of the thalamobot 125, ideational chains formed in the midst of higher noise levels, may reactivate as memories that in turn connect with other modules that collectively represent a perceptual or emotional response to said initial chain.

Figure 9:
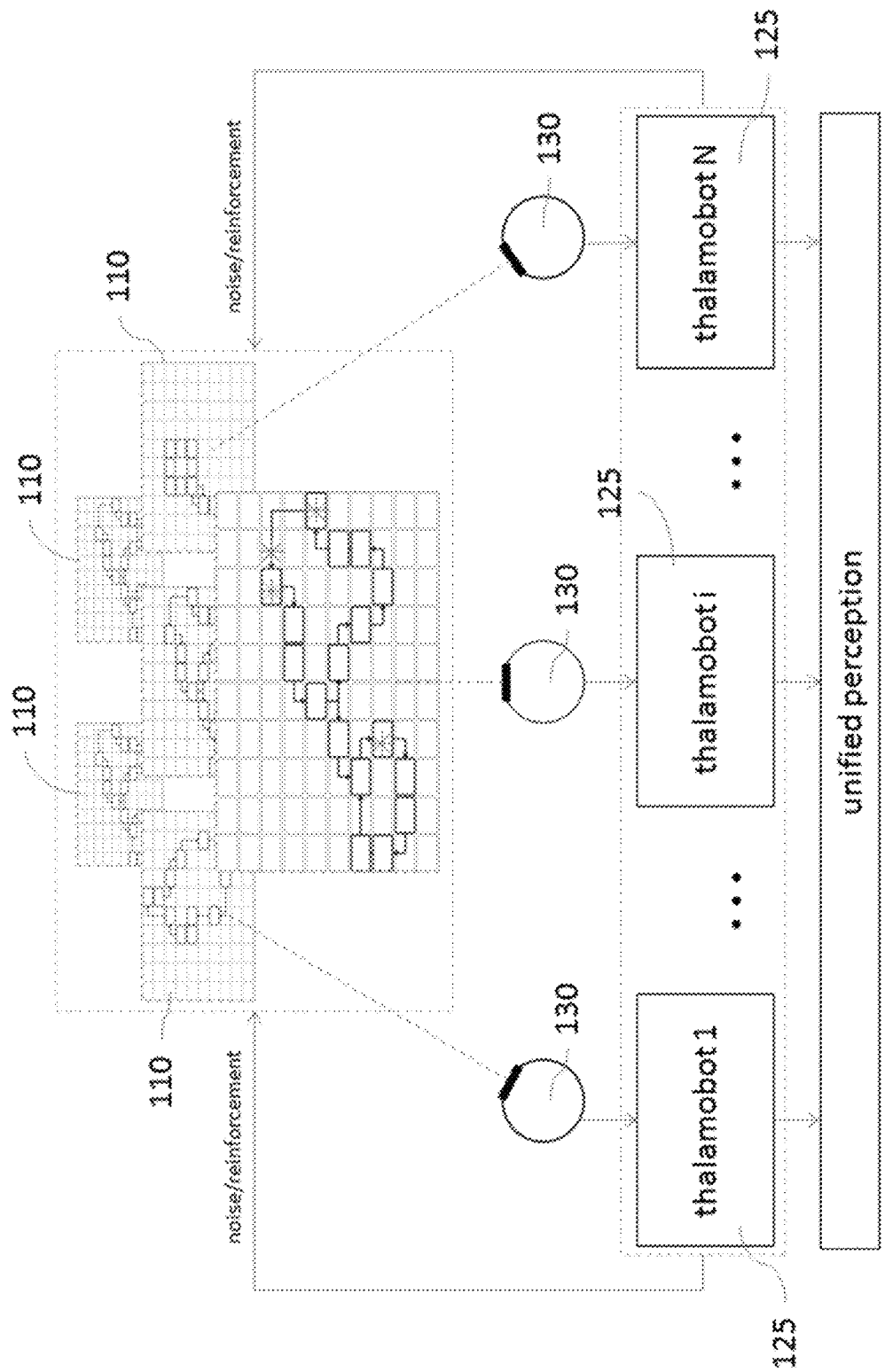
FIG. 9 is a schematic block representation of a system including multiple thalamobots interacting with multiple imagitrons.

A key limitation of the basic model of human thought is that it involves a bottleneck in that all cortical activity must pass through the single monitoring/thalamic system. The system described herein is capable of overcoming this limitation through the use of multiple thalamobots 125, as shown in FIG. 9. Multiple thalamobots 125 may monitor a single audio/visual output 120, or multiple audio/visual outputs 120 may be used with the multiple thalamobots 125 monitoring those multiple outputs 120. In a preferred embodiment, the responses of each of the individual thalamobots 125 are integrated into a single perceptual pattern with a downstream network.

Embodiments of the system may also be integrated to learn complex input-output mapping. For example, sub-networks of the compound imagitron 110 are used to form the equivalent of a hidden layer within a conventional, multi-layer perceptron. The thalamobot 125 forms the equivalent of the output layer(s) of the multi-layer perceptron and has the ability to trigger learning or noise within the cortical sub-networks. In subsequent learning cycles, the connections within the compound imagitron 110 and thalamobot 125 are iteratively corrected to achieve a more accurate mapping.

In a highly unique adaptation of the present system, it is theorized that artificial consciousness may be produced. Neural modules 115 in the compound imagitron 110, bathed in various forms of noise, are continuously chaining to produce the equivalent of a stream of consciousness while a monitoring thalamobot 125 governs the simulated injection of stress and potentiating neurotransmitters through the adjustment of noise and learning parameters to the neural modules 115 of the imagitron 110. Ideations seeded by any combination of environmental inputs and/or noise will trigger subsequent associative chains 410 representing a progression of related past experience that will likely incorporate neural modules 115 encoding existential significance (e.g., threats or fulfillment). Having detected the activation of such existential modules 115, the thalamobot 125 may trigger reinforcement of such ideational chains 410 or erase or modify them through the introduction of perturbations. In generating such artificial consciousness, components of the system will invent significance, valid or not, to the activations of its neural collective as it would normally attach significance to environmental patterns.

The system may also be adapted such that the thalamobot 125 is used to combine multiple neural audio/visual outputs 120 into a projective distillation of thoughts forming therein. Additionally, one or more thalamobots 125 may be used to observe any environment (e.g., a monitor displaying a functional brain scan) to detect the rhythm with which anomalous chaining is occurring among the features of said environment.

Novel methods of computing may also be employed, in which an imagitron 110 is built upon a multi-core architecture, distributing its GMF modules into separate processors. If the GMF/module aboard a processor outputs a pattern, only a select few processors will respond to that pattern to initiate a linking process. The most resonant processor will be the next to join the chain. With an associative memory in the thalamobot 125 suggesting the next member(s) of the processor chain, this chaining of processors may be further improved.

In one embodiment, a GMF may be incorporated into the registers, stack, or heap space (i.e., RAM or cache) associated with any given processor to govern how it will cooperate with other such GMF-equipped processors in generating associative chains within imagitrons 110 or thalamobots 125 in a system. In a first step, a broadcast of a pattern to one or more processors takes place, with reconstruction error being calculated on each said processor. That processor-based GMF with the lowest reconstruction error then triggers other functions on the thusly selected processor, such as adaptive training so as to convert the resonant associative network to a hetero-associative one or to deepen a memory therein. Alternately, a collection of GMFs may respond to a pattern broadcast, with the GMF most resonant with said pattern triggering functionalities of the one or more processors associated with it.

For example, GMF modules may be assigned to separate processors (0, 1, 2, . . . N). If the GMF operative within each processor resonates through low reconstruction error with the input pattern, P, reinforcement learning of said pattern by the same resonant GMF then occurs or other such functionality may be triggered within the same processor. In some cases, several GMFs may be delegated to a single processor, with each responsible for triggering other functionality of said processor.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

What is claimed is:

1. A system for avoiding processing bottlenecks from occurring while providing data about states of a plurality of interconnecting neural modules representing an environment in order to identify positions, geometries, and topologies of chains of the interconnecting neural modules, the system comprising:
   an electronic pathway for outputting states of an imagitron in the form of a plurality of neural modules, wherein the state of each neural module represents a reconstruction error of the neural module or activations of individual neurons therein, wherein the state is communicated electronically as an array of values;
   a thalamobot embodied in at least one first processor, said at least one first processor in communication with the array of neural modules, said thalamobot including:
   at least one filter, wherein said at least one filter stores memories of one or more previous topologies of the at least one chain, and wherein the at least one filter is configured for globally monitoring the states of the plurality of neural modules in the captured states from said optical display and for identifying when the topology of the at least one chain is novel, wherein the novel topology is different from the one or more previous topologies stored within said at least one filter; and
   at least one critic, wherein said at least one filter forwards said at least one chain having the novel topology to said at least one critic, and wherein said critic judges merit of said at least one novel chain, said merit governing noise injected into an imagitron for strengthening or weakening the chain, wherein said thalamobot is in electronic communication with said imagitron for controlling said strengthening and said weakening.

2. The system of claim 1 wherein said filter includes an anomaly filter.

3. The system of claim 1 wherein said filter includes a rhythm detector.

4. The system of claim 1 wherein said critic includes a plurality of neural modules.

5. The system of claim 4 wherein said plurality of neural modules chain together in patterns which serve as a figure of merit for said at least one novel chain.

6. The system of claim 4 wherein the neural modules are embodied on an array of processors.

7. The system of claim 4 wherein the neural modules are embodied on a single processor.

8. The system of claim 1 wherein said thalamobot is embodied on the at least one processor in a computer system which is separate from a computer system on which the model of the environment is generated.

9. The system of claim 8 wherein the thalamobot is in communication with said computer system on which the model of the environment is generated to modify a level of noise injected into the model.

10. The system of claim 9 wherein raising the level of noise to the model generates new ideas within the model.

11. The system of claim 8 wherein the thalamobot is in communication with said computer system on which the model of the environment is generated to promote learning within the model.

12. The system of claim 1 wherein the states of the plurality of neural modules are presented as arrays of reconstruction errors of a plurality of neural modules in an imagitron.

13. The system of claim 1 wherein the states of the plurality of neural modules are presented by the array of neural modules in a form interpretable as topology of chains forming in an imagitron.

14. The system of claim 1 wherein the states of the plurality of neural modules are presented electronically by the imagitron in the form of activation histories of a plurality of neural modules in an imagitron.

15. The system of claim 1 wherein the states of the plurality of neural modules are presented by the imagitron as states interpretable as topological chain formation histories of a plurality of neural modules in an imagitron.

16. The system of claim 1 wherein the model of the environment is a brain scan.

17. A system for avoiding processing bottlenecks from occurring while providing data about states of a plurality of interconnecting neural modules representing an environment to a critic in order to identify positions, geometries, and topologies of chains of the interconnecting neural modules, the system comprising:

an imagitron embodied on at least a first processor, said imagitron including a first plurality of interconnecting neural modules having states representing a reconstruction error of the neural module or activations of individual neurons therein, the interconnected first plurality of neural modules comprising one or more associative chains of said neural modules, the one or more associative chains each having a topology, and said imagitron capable of accepting environmental inputs; an array associated with said imagitron for outputting the state of one or more of the first plurality of neural modules; electrical paths for conveying the state of one or more of the first plurality of neural modules output to a thalamobot; a thalamobot embodied on at least a second processor separate from the at least one first processor, said second processor in electronic communication with the thalamobot, said thalamobot including at least one filter for globally monitoring the states of the first plurality of neural modules in the captured states from said array of neural module responses and for identifying at least one state change within the positions, geometries, and topologies of the one or more associative chains; wherein said thalamobot is in electronic communication with said imagitron for controlling chain cancellation and chain reinforcement within the imagitron; and at least one critic, wherein said at least one filter forwards said at least one state change within the positions, geometries, and topologies of the one or more associative chains to said at least one critic, and wherein said critic judges merit of said at least one change within the positions, geometries, and topologies of the one or more associative chains for strengthening or weakening the one or more associative chains.

18. The system of claim 17 wherein the array of neural module responses presents the data in the form of respective reconstruction errors of at least some of the first plurality of neural modules.

19. The system of claim 17 wherein the array of neural module responses presents the data in the form of activations of at least some of the first plurality of neural modules.

20. The system of claim 17 wherein said filter is an anomaly filter.

21. The system of claim 17 wherein said filter is a rhythm detector.

22. The system of claim 17 wherein the imagitron transmits data output in the form of an array of activations of at least some of the first plurality of neural modules.

23. The system of claim 17 wherein said critic includes a second plurality of neural modules.

24. The system of claim 17 wherein said filter includes a third plurality of neural modules.

25. The system of claim 24 wherein respective clusters of one or more neural modules of said second or third plurality of neural modules are assigned to monitor pre-assigned portions of the output data from said optical display.

26. The system of claim 17 wherein said thalamobot is in electronic communication with said imagitron for controlling a noise level within said first plurality of neural nodes.

27. The system of claim 26 wherein said thalamobot causes an increase in the noise level within said first plurality of neural nodes in response to a lack of meritorious associative chains as determined by said at least one critic.

28. The system of claim 17 wherein said thalamobot foveationally monitors the data output within the array of responses from the array of neural modules.

29. The system of claim 17 wherein the thalamobot includes a plurality of thalamobots, each analyzing respective portions of said output data captured within said array of responses from the neural modules.

30. The system of claim 17 wherein a plurality of non-optical input devices are used.

31. The system of claim 30 wherein the thalamobot includes a plurality of thalamobots, each analyzing respective portions of said output data captured from said non-optical sensors.

32. The system of claim 17 wherein the thalamobot is in communication with said imagitron to raise the level of noise in the imagitron to generate new associative chains within the imagitron.

33. The system of claim 17 wherein the thalamobot is in communication with said imagitron to raise the level of noise in the imagitron to generate variations in interpretation of the environmental inputs to the imagitron.

34. The system of claim 17 wherein the thalamobot is in communication with said imagitron to promote reinforcement of desirable associative chains within the imagitron.

35. The system of claim 17 wherein the thalamobot is in communication with said imagitron to discourage undesirable associative chains within the imagitron.

36. The system of claim 17 wherein said critic is embodied within said first set of neural modules of said imagitron.

37. The system of claim 17 wherein said imagitron instructs one or more of said neural modules in said first plurality of neural modules to operate hetero-associatively or auto-associatively.

38. The system of claim 17 wherein a progression of ideation chains of said first plurality of neural modules of said imagitron emulate a stream of consciousness, and said thalamobot forms response chains that encode a subjective feel regarding said stream of consciousness, said subjective feel governing release of perturbations into said chaining model of the environment to promote or impede associative chains therein.

39. The system of claim 17 wherein said thalamobot further includes at least one buffer to capture ordinality of chain formations.

40. A system for avoiding processing bottlenecks from occurring while providing data about states of a plurality of interconnecting neural modules representing an environment in order to identify positions, geometries, and topologies of chains of the interconnecting neural modules, the system comprising:

an imagitron embodied on at least a first processor, said imagitron including a first plurality of interconnecting neural modules having states representing a reconstruction error of the neural module or activations of individual neurons therein, the interconnected first plurality of neural modules comprising one or more associative chains of said neural modules, the one or more associative chains each having a topology, and said imagitron capable of accepting environmental inputs;

an electrical pathway in communication with said imagitron for outputting the state of one or more of the first plurality of neural modules;

a means for filling an array with the state of one or more of the first plurality of neural modules output via an electrical pathway;

a thalamobot embodied on at least a second processor separate from the at least one first processor, said second processor in electronic communication with the array of responses from the imagitron's neural modules;

wherein said thalamobot also includes at least one recognition system which recognizes sub-pattern topologies within the topologies of the one or more associative chains of said first plurality of neural modules as monitored by the camera, said sub-pattern topologies having formed in reaction to ideational sub-patterns within the topologies of the one or more associative chains of said first plurality of neural modules, and said recognition system determining merit or lack thereof in said sub-pattern topologies based on at least one of the location, shape, topology, reconstruction error, and activation of said sub-pattern topologies, wherein said thalamobot is in electronic communication with said imagitron for controlling chain cancellation and chain reinforcement within the imagitron.

41. The system of claim 40 wherein said recognition system controls injection of noise into the imagitron and reinforcement learning within the imagitron.

42. The system of claim 40 wherein said thalamobot directs chaining of neural modules within the imagitron through an associative memory.

43. The system of claim 40 wherein injection of noise into the imagitron causes the formation of latent ideas via wearing-in of pathways between modules.

44. The system of claim 40 wherein at least some of said first plurality of modules are each embodied on a separate processor, wherein said processor has access to electronic memory, and wherein a Group Membership Filter (GMF) is incorporated into at least one of said processors.

45. The system of claim 44 wherein each said GMF governs how its respective processor cooperates with other such GMF-equipped processors in generating associative chains within at least one of said imagitron and said thalamobot.

46. The system of claim 40 wherein said thalamobot includes at least one filter for monitoring captured data from said camera and for identifying at least one state change within the captured data, said filter passing said at least one state change to the recognition system.

47. A system for avoiding processing bottlenecks from occurring while providing data about states of a plurality of interconnecting neural modules representing an environment in order to identify positions, geometries, and topologies of chains of the interconnecting neural modules, the system comprising:

an imagitron embodied on at least a first processor, said imagitron including a first plurality of interconnecting neural modules having states representing a reconstruction error of the neural module or activations of individual neurons therein, the interconnected first plurality of neural modules comprising one or more associative chains of said neural modules, the one or more associative chains each having a topology, and said imagitron capable of accepting environmental inputs;

an electrical pathway for communication for broadcasting the state of one or more of the first plurality of neural modules;

an array of responses states of the first plurality of neural modules of one or more of the said first plurality of neural modules output via one or more electrical pathways;

a thalamobot embodied on at least a second processor separate from the at least one first processor, said second processor in electronic communication with the camera;

wherein said thalamobot also includes at least one mapping system which detects the states of said first plurality of neural modules as monitored by the camera, and maps said states to at least one resulting output pattern, said output pattern encoding at least one of figure of merit of said chaining states and governing noise injected into said imagitron for strengthening or weakening the one or more associative chains, wherein said thalamobot is in electronic communication with said imagitron for controlling said strengthening and said weakening.

48. A system for avoiding processing bottlenecks from occurring while providing data about states of a plurality of interconnecting neural modules representing an environment in order to identify positions, geometries, and topologies of chains of the interconnecting neural modules, the system comprising:

an electrical pathway for presenting states of the plurality of neural modules, wherein the state of each neural module represents a reconstruction error of the neural module or activations of individual neurons therein, wherein the state is outputted via the electrical pathway as a value, and wherein at least two or more neural modules of the plurality are connected together to form at least one chain, the at least one chain having a topology;

an electrical pathway for conveying the states of said plurality of neural modules; and a thalamobot embodied in at least one first processor, said at least one first processor in electrical communication with the response array of neural module states, said thalamobot including:

at least one critic, wherein said at least one critic judges a figure of merit of at least one topological state change of said topology of the at least one chain, wherein said thalamobot is in electronic communication with the plurality of neural modules for controlling chain cancellation and chain reinforcement of the neural modules.

\* \* \* \* \*